United States Patent
Minowa

(10) Patent No.: US 7,395,392 B2
(45) Date of Patent: Jul. 1, 2008

(54) STORAGE SYSTEM AND STORAGE CONTROL METHOD

(75) Inventor: Nobuyuki Minowa, Ooi (JP)

(73) Assignee: Hitachi, Ltd., Tokyo (JP)

( * ) Notice: Subject to any disclaimer, the term of this patent is extended or adjusted under 35 U.S.C. 154(b) by 303 days.

(21) Appl. No.: 11/144,628

(22) Filed: Jun. 6, 2005

(65) Prior Publication Data

US 2006/0236052 A1    Oct. 19, 2006

(30) Foreign Application Priority Data

Apr. 1, 2005    (JP) .............................. 2005-106613

(51) Int. Cl.
*G06F 12/14*    (2006.01)

(52) U.S. Cl. ........................ 711/163; 711/152; 711/114; 710/200

(58) Field of Classification Search ........................ None
See application file for complete search history.

(56) References Cited

U.S. PATENT DOCUMENTS

| | | | |
|---|---|---|---|
| 5,859,975 A | 1/1999 | Brewer et al. ................ | 709/213 |
| 6,564,294 B1 * | 5/2003 | Fujibayashi et al. .......... | 711/114 |
| 7,028,147 B2 * | 4/2006 | Wu et al. ...................... | 711/150 |
| 2004/0064637 A1 * | 4/2004 | Fujibayashi et al. .......... | 711/113 |
| 2004/0117580 A1 * | 6/2004 | Wu et al. ...................... | 711/170 |

FOREIGN PATENT DOCUMENTS

| | | |
|---|---|---|
| EP | 1400894 | 3/2004 |
| EP | 1 443 411 A2 | 8/2004 |
| JP | 2001-306265 | 11/2001 |

* cited by examiner

*Primary Examiner*—Denise Tran
(74) *Attorney, Agent, or Firm*—Mattingly, Stanger, Malur & Brundidge, P.C.

(57) ABSTRACT

A controller and one or more intermediate devices that are connected to a plurality of processors and this controller so that communications are possible are provided. A first access message including a designated value designated by the processor is transmitted to the controller by a first intermediate device connected to the processor. The controller specifies a local memory address corresponding to the designated value included in the first access message, and transmits a second access message including this specified local memory address to two or more other processors. The two or more other processors or second intermediate devices that are connected to these processors access local memory regions of two or more local memories respectively corresponding to two or more other processors, which are local memory regions corresponding to the local memory addresses included in the second access message.

11 Claims, 16 Drawing Sheets

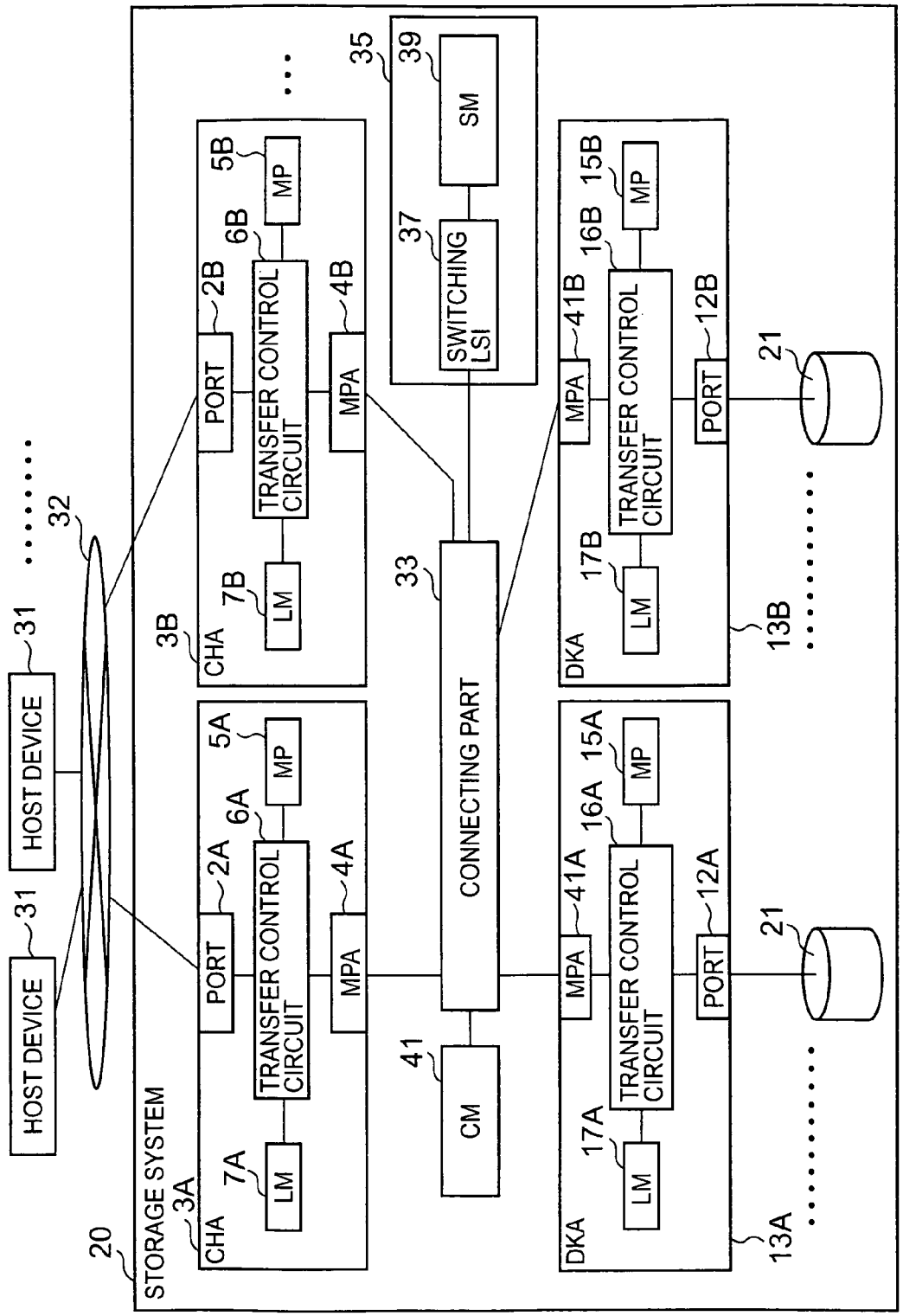

| ADDRESS | ASSIGNMENT | LM MAP OF LM 7A 71A | LM MAP OF LM 7B 71B | LM MAP OF LM 17A 73A |
|---|---|---|---|---|
| 0 | WRITE REGION FOR MP 5A | WRITE REGION FOR MP 5A | READ-OUT REGION FOR MP 5B | READ-OUT REGION FOR MP 15A |
| 1 | WRITE REGION FOR MP 5B | READ-OUT REGION FOR MP 5A | WRITE REGION FOR MP 5B | READ-OUT REGION FOR MP 15A |
| 2 | WRITE REGION FOR MP 15A | READ-OUT REGION FOR MP 5A | READ-OUT REGION FOR MP 5B | WRITE REGION FOR MP 15A |
| ⋮ | ⋮ | ⋮ | ⋮ | ⋮ |

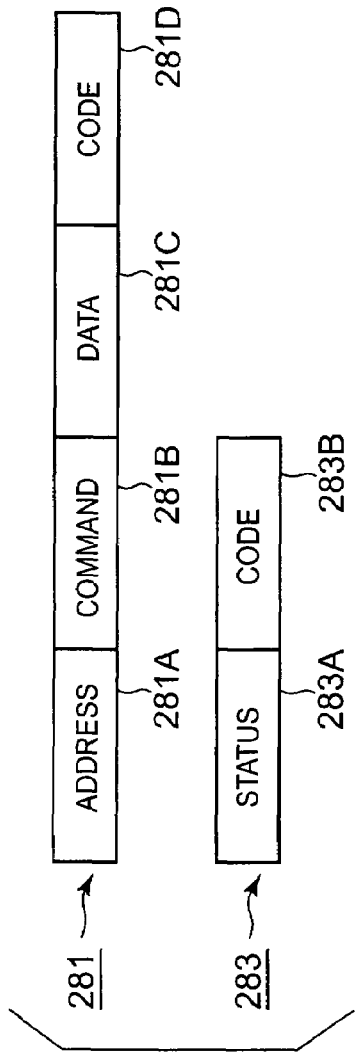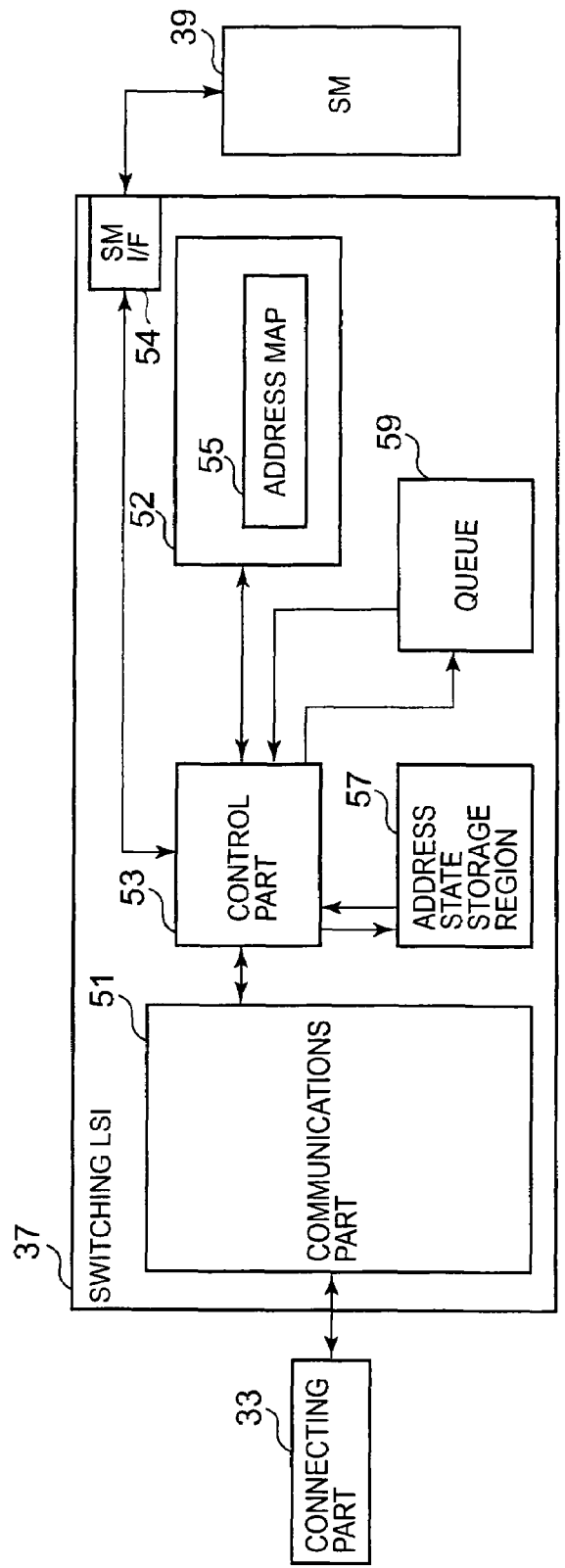

FIG. 4

| NO. | ADDRESS SETTING | | SENDING DESTINATION MP MAP | | | | | | | |
|---|---|---|---|---|---|---|---|---|---|---|
| | | | CHA | | | | DKA | | | |
| | | | 3A | 3B | 3C | 3D | 13A | 13B | 13C | 13D |
| | START | END | MP5A | MP5B | MP5C | MP5D | MP15A | MP15B | MP15C | MP15D |
| 1 | 0x0000 | 0x0fff | 1 | 0 | 0 | 0 | 0 | 0 | 0 | 0 |
| 2 | 0x1000 | 0x1fff | 0 | 1 | 0 | 0 | 0 | 0 | 0 | 0 |
| 3 | 0x2000 | 0x2fff | 0 | 0 | 1 | 0 | 0 | 0 | 0 | 0 |
| 4 | 0x3000 | 0x3fff | 0 | 0 | 0 | 1 | 0 | 0 | 0 | 0 |
| 5 | 0x4000 | 0x4fff | 0 | 0 | 0 | 0 | 1 | 0 | 0 | 0 |
| 6 | 0x5000 | 0x5fff | 0 | 0 | 0 | 0 | 0 | 1 | 0 | 0 |
| 7 | 0x6000 | 0x6fff | 0 | 0 | 0 | 0 | 0 | 0 | 1 | 0 |
| 8 | 0x7000 | 0x7fff | 0 | 0 | 0 | 0 | 0 | 0 | 0 | 1 |
| 9 | 0x8000 | 0x8fff | 1 | 1 | 1 | 1 | 0 | 0 | 0 | 0 |
| 10 | 0x9000 | 0x9fff | 1 | 1 | 1 | 1 | 0 | 0 | 0 | 0 |
| 11 | 0xa000 | 0xafff | 1 | 1 | 1 | 1 | 0 | 0 | 0 | 0 |
| 12 | 0xb000 | 0xbfff | 1 | 1 | 1 | 1 | 0 | 0 | 0 | 0 |
| 13 | 0xc000 | 0xcfff | 0 | 0 | 0 | 0 | 1 | 1 | 1 | 1 |
| 14 | 0xd000 | 0xdfff | 0 | 0 | 0 | 0 | 1 | 1 | 1 | 1 |
| 15 | 0xe000 | 0xefff | 0 | 0 | 0 | 0 | 1 | 1 | 1 | 1 |
| 16 | 0xf000 | 0xffff | 0 | 0 | 0 | 0 | 1 | 1 | 1 | 1 |
| 17 | 0x10000 | 0x10fff | 1 | 1 | 0 | 0 | 1 | 0 | 0 | 0 |
| 18 | 0x11000 | 0x11fff | 1 | 0 | 0 | 0 | 1 | 0 | 0 | 0 |
| 19 | 0x20000 | 0x0fff | 1 | 1 | 1 | 1 | 1 | 1 | 1 | 1 |
| 20 | 0x21000 | 0x1fff | 1 | 1 | 1 | 1 | 1 | 1 | 1 | 1 |
| 21 | 0x2000 | 0x2fff | 1 | 1 | 1 | 1 | 1 | 1 | 1 | 1 |
| 22 | 0x23000 | 0x3fff | 1 | 1 | 1 | 1 | 1 | 1 | 1 | 1 |
| 23 | 0x24000 | 0x4fff | 1 | 1 | 1 | 1 | 1 | 1 | 1 | 1 |
| 24 | 0x25000 | 0x5fff | 1 | 1 | 1 | 1 | 1 | 1 | 1 | 1 |
| 25 | 0x26000 | 0x6fff | 1 | 1 | 1 | 1 | 1 | 1 | 1 | 1 |
| 26 | 0x27000 | 0x7fff | 1 | 1 | 1 | 1 | 1 | 1 | 1 | 1 |

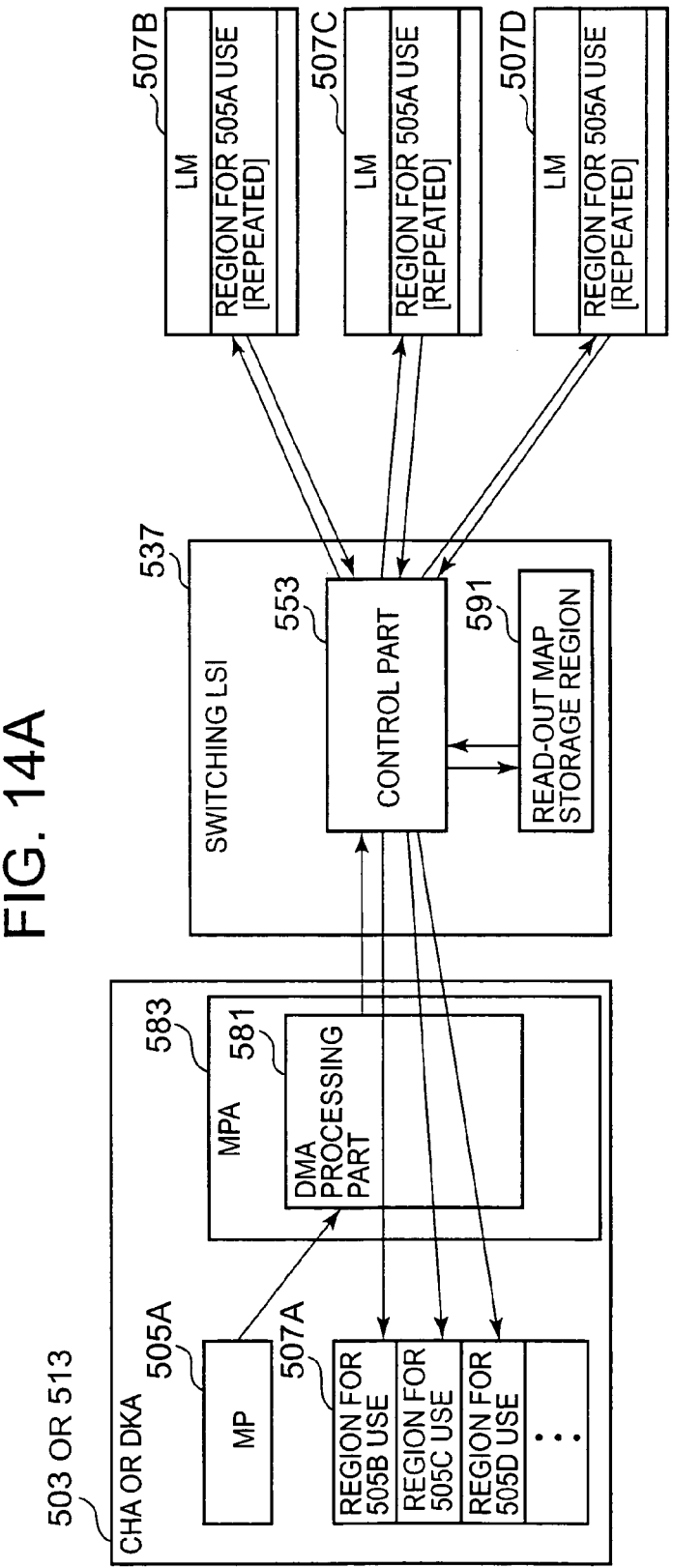

STORAGE SYSTEM AND STORAGE CONTROL METHOD

CROSS-REFERENCE TO PRIOR APPLICATION

This application relates to and claims priority from Japanese Patent Application No. 2005-106613 filed on Apr. 1, 2005, the entire disclosure of which is incorporated herein by reference.

BACKGROUND ART

1. Field of the Invention

The present invention relates to a technique for a system comprising a plurality of processors, e.g., a storage system and storage control method that control access to storage.

2. Description of the Related Art

For example, the disk array control device described in Japanese Patent Application Laid-Open No. 2001-306265 is known as a system comprising a plurality of processors. This disk array control device comprises a plurality of channel adapters that perform input-output control with a host computer, a plurality of disk adapters that control input and output with magnetic disk devices, and a shared memory mounted processor that comprises a shared memory and an internal data cache. A plurality of channel adapter mounted processors are mounted on the plurality of disk adapters. Access to the shared memory from the channel adapter mounted processors and disk adapter mounted processors is performed via the internal data cache. As a result, the time required for access to the shared memory can be reduced.

SUMMARY OF THE INVENTION

One or more memories (hereafter referred to as "local memories" in order to distinguish these memories from the shared memory) can be connected so that communications are possible to the processors installed in channel adapters and disk adapters. The processors can communicate with other processors via the shared memory, and the data that is the object of communications can be read out of and written into the local memories. In concrete terms, for example, the processors can write data for other processors into the shared memory, and can read data written by other processors from the shared memory. Such data that is the object of writing and data that is read out can be written into the local memories, and can be read out from these local memories. The shared memory (e.g., a memory controller that is interposed between the shared memory and the processors) can send back a response to the processor that is the writing origin at a certain timing (e.g., timing at which the data is written or timing at which the data is read out from another processor).

However, in the case of the abovementioned inter-processor communications, access to the shared memory is concentrated, and it is conceivable that the waiting time length for a response from the side of the shared memory might create a bottleneck in the processing performance. In concrete terms, for example, the path between the shared memory and the processor may be occupied until a response is sent back to the processor from the shared memory, so that the processing performance of the respective processors might conceivable drop.

Furthermore, in the case of the abovementioned inter-processor communications, access to the shared memory by the respective processors must pass through several devices (e.g., communications interface device, switches and the like). Accordingly, it would appear that at least a time that is longer than that required in the case of access to the local memories by the processors would be required for this access (especially read-out requiring data). In this regard as well, a bottleneck may be created in the processing performance.

Accordingly, it is an object of the present invention to suppress a drop in the processing performance of the plurality of processors.

Other objects of the present invention will become clear from the following description.

The storage system according to a first aspect of the present invention comprises a plurality of processors, a plurality of local memories which are respectively provided for the abovementioned plurality of processors, a controller, and one or more intermediate devices connected to the abovementioned plurality of processors and the abovementioned controller so that communications are possible. Each of the abovementioned plurality of local memories has a plurality of local memory addresses and local memory regions respectively corresponding to the abovementioned plurality of local memory addresses. A first access message including a designated value which is a value designated by the processor is transmitted to the abovementioned controller by a first intermediate device that is connected to this processor. The abovementioned controller receives the first access message from the abovementioned first intermediate device, specifies a local memory address corresponding to the designated value included in the abovementioned received first access message, and transmits a second access message including the specified local memory address to two or more other processors. A second intermediate device respectively connected to the abovementioned two or more other processors receives said second access message, and this second intermediate device or the abovementioned two or more other processors access the local memory regions of two or more local memories respectively corresponding to the abovementioned two or more other processors, which are local memory regions corresponding to the local memory addresses included in the abovementioned second access message.

Here, the intermediate devices may be a type of interface device (e.g., the MPA described later) mounted in a package such as the CHA, DKA or the like described later, or may be transfer control circuits as described later.

In one embodiment, the abovementioned controller can control locking on and locking off for the respective local memory addresses. In concrete terms, in cases where the local memory address corresponding to the designated value included in the received first access message is locked off, the controller locks on this local memory address, and the first access message is subsequently processed, and the controller locks off the local memory address at a timing following the transmission of the second access message. Furthermore, in cases where the local memory address corresponding to the designated value included in the abovementioned received first access message is locked on, the processing of the abovementioned first access message can be executed by the abovementioned controller after the abovementioned local memory address is locked off.

In one embodiment, the abovementioned processors can send a request to the abovementioned controller requesting that the local memory address corresponding to the local memory region be locked on before reading out data from this local memory region of the local memory prepared for each of these processors itself. Here, the abovementioned controller can transmit notification to the abovementioned processors as to whether or not the local memory addresses that are the object of requests from these processors have been successfully locked on. In cases where notification that locking on has been successfully accomplished is received by the abovementioned processors, these processors can read out data from the abovementioned local memory regions.

In one embodiment, the same local memory address of the abovementioned plurality of local memories may be assigned to a specified processor. In this case, the local memory region corresponding to the local memory address assigned to the abovementioned processor may be a write region for this processor, and may be a read-out region for the abovementioned other processors.

In one embodiment, the abovementioned processor may write data into the abovementioned write region, and the abovementioned first intermediate device may transmit the abovementioned first access message in which the local memory address corresponding to the abovementioned write region is taken as the abovementioned designated value to the abovementioned controller.

In one embodiment, the abovementioned storage system may comprise an access map recording a plurality of sets of access destination data respectively corresponding to a plurality of designated values. Here, it may be noted which processor is taken as the access destination for each of the abovementioned plurality of sets of access destination data. The abovementioned controller may specify the access destination data corresponding to the designated value included in the abovementioned received first access message from the abovementioned access map, and may transmit the abovementioned second access message to two or more other processors expressed by the abovementioned specified access destination data.

In one embodiment, the abovementioned two or more other processors may constitute a processor group that has specified attributes.

In one embodiment, a shared memory that can be accessed by the abovementioned plurality of processors via the abovementioned controller may be connected to the abovementioned controller. The abovementioned controller may write data that is the object of access to the abovementioned two or more local memories into the abovementioned shared memory.

In one embodiment, the abovementioned controller may determine the abovementioned two or more other processors on the basis of the designated value included in the abovementioned first access message, and the processor that designated the abovementioned designated value.

In one embodiment, a first path from the abovementioned controller to the abovementioned respective intermediate devices and a second path from the abovementioned respective intermediate devices to the abovementioned controller may be disposed between the abovementioned controller and the respective intermediate devices. The abovementioned controller may receive the abovementioned first access message via the abovementioned second path, and may transmit the abovementioned second access message via the abovementioned first path.

In one embodiment, the abovementioned controller may execute one of the following response systems (A) through (F) in cases where this controller receives the abovementioned first access message and transmits the abovementioned second access message:

(A) the controller sends back a response to the abovementioned processor before receiving a response to the abovementioned second access message from the abovementioned two or more other processors;

(B) the controller sends back a response to the abovementioned processor each time that the controller receives a response to the abovementioned second access message from the abovementioned two or more other processors;

(C) the controller sends back a response to the abovementioned processor after receiving a response to the abovementioned second access message from all of the abovementioned two or more other processors;

(D) the controller sends back a response to the abovementioned processor each time that a response output from the abovementioned two or more other processors in cases where data is written into the abovementioned two or more local memories in accordance with the abovementioned second access message is received from each of the abovementioned two or more other processors;

(E) the controller sends back a response to the abovementioned processor after receiving a response output from the abovementioned two or more other processors in cases where data is written into the abovementioned two or more local memories in accordance with the abovementioned second access message from all of the abovementioned two or more other processors; and (F) the controller performs reception of the abovementioned first access message and transmission of the abovementioned second access message a multiple number of times, and sends back a response to the abovementioned processor after receiving a plurality of responses to the abovementioned plurality of second access messages from the abovementioned two or more other processors.

In one embodiment, the abovementioned controller can employ one response system among the abovementioned response systems (A) through (F) on the basis of at least one feature selected from the reliability with which access is accurately performed, the occupation rate of the path between the abovementioned controller and the abovementioned intermediate devices, and the length of the response time required for the response to the abovementioned processor after the abovementioned first access message has been transmitted, and can execute the selected response system.

In one embodiment, a plurality of storage devices including a local memory prepared for the processor itself and other local memories for other processors may be disposed in each processor. Each processor may comprise a processor core which issues the designated value, and an access control circuit which determines two or more storage devices from a plurality of storage devices including a local memory prepared for the abovementioned processor and local memories for other processors on the basis of the value issued by the abovementioned processor core, and each processor can access the abovementioned two or more determined storage devices.

The processor according to a second aspect of the present invention may comprise a processor core which issues a value, and an access control circuit which determines two or more storage devices from a plurality of storage devices including a local memory prepared for the abovementioned processor and local memories for other processors on the basis of the value issued by the abovementioned processor, and this processor can access the abovementioned two or more determined storage devices.

The storage control method according to a third aspect of the present invention is devised so that in a case where each of a plurality of local memories respectively prepared for a plurality of processors has a plurality of local memory addresses and local memory regions respectively corresponding to the abovementioned plurality of local memory addresses, first access messages that include a designated value which is a value designated by the processor are transmitted to a controller from first intermediate devices that are connected to the processors, the local memory addresses corresponding to the designated values included in the abovementioned first access messages are specified, second access messages including these specified local memory addresses are transmitted from the abovementioned controller to two or more other processors, and local memory regions of two or more local memories respectively corresponding to the abovementioned two or more other processors, which are the local memory regions corresponding to the local memory addresses included in the abovementioned second access message, are accessed.

Furthermore, at least one device among the abovementioned intermediate devices and controller, or the function that executes the processing of such devices, can be expressed by the term "means". Moreover, such "means" can be realized using hardware, computer programs or a combination of both.

BRIEF DESCRIPTION OF THE DRAWINGS

FIG. 1 shows an outline of one example of the hardware construction of a system constituting a first embodiment of the present invention;

FIG. 3A shows an example of the construction of the messages that are exchanged between the respective CHAs 3 and respective DKAs 13, and the switching LSI 37;

FIG. 3B shows an example of the hardware construction of the switching LSI 37;

FIG. 4 shows an example of the construction of the address map 55;

FIG. 14A is an explanatory diagram of the multi LM readout that is performed in a fourth example of the first embodiment of the present invention;

FIG. 14B shows an example of the construction of the read-out map 592;

DESCRIPTION OF THE PREFERRED EMBODIMENTS

Figures 2A, 2B:
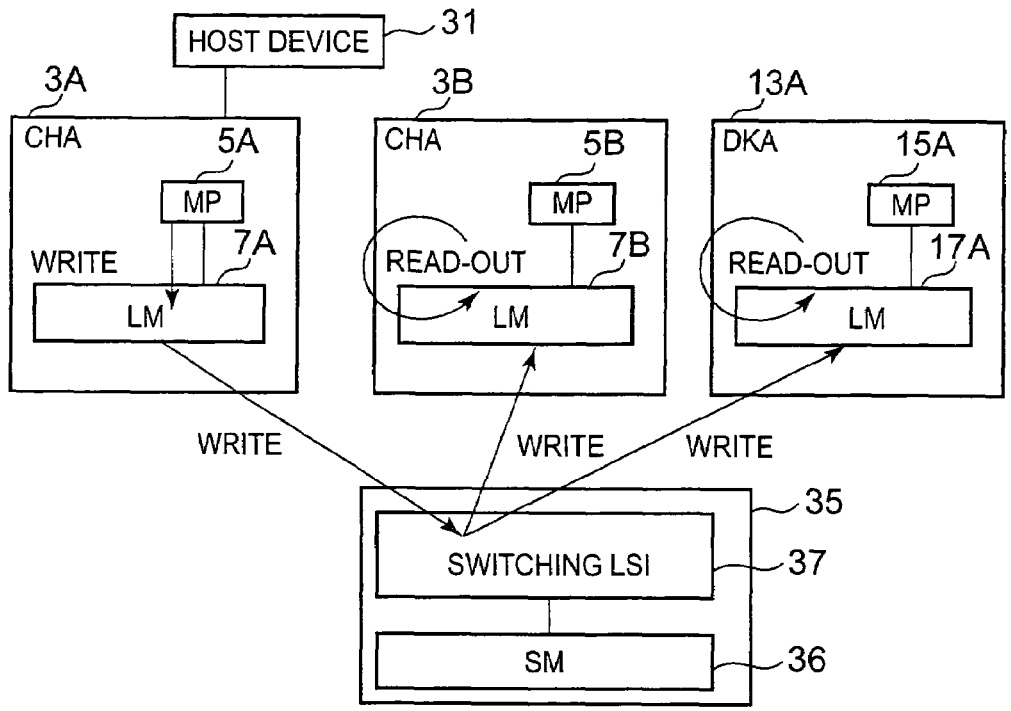
FIG. 2A shows an outline of one type of processing performed in the first embodiment of the present invention.
FIG. 2B shows an example of the construction of the LM map of the LMs 7 and 17.

Several examples of the present invention will be described below with reference to the attached figures.

EXAMPLE 1

FIG. 1 shows an example of the hardware construction of a system constituting a first example of the present invention. In the following description, in cases where elements of the same type (e.g., CHA) are distinguished, reference numbers constructed from parent numbers (e.g., 3) and branch symbols (e.g., A) are sued for the elements that are distinguished; however, in cases where elements of the same type are not distinguished, there may be instances in which only the parent numbers are used.

One or more host devices 31 and storage systems 20 re connected to a communications network (e.g., an LAN (local area network) or SAN (storage area network)) 32.

The respective host devices 31 are computer machines comprising at least one hardware resource selected from a set consisting of (e.g.) CPUs, memories, input devices (e.g., mice or keyboards) and output devices (e.g., display devices). For example, the respective host devices 31 may be personal computers, workstations, server machines or the like. The host devices 31 can transmit write requests, data that is the object of writing, read requests and the like to the storage systems 20. The host devices 31 may be a main frame type computer. In such cases, at least one of the plurality of CHAs 3A, 3B . . . described later may be a main frame type computer. For example, communications between a hose device 31 as a main frame computer and a main frame type CHA 3 can be performed according to a communications protocol such as FICON (Fiber Connection: registered trademark), ESCON (Enterprise System Connection: registered trademark), ACONARC (Advanced Connection Architecture: registered trademark), FIBARC (Fiber Connection Architecture: registered trademark) or the like.

Each storage system 20 comprises a plurality of channel adapters (hereafter referred to as CHAs) 3A, 3B, . . . (a single channel adapter may also be used), a plurality of storages 21, 21, . . . (a single storage may also be used), a plurality of disk adapters (hereafter referred to as DKAs) 13A, 13B, . . . (a single disk adapter may also be used), a cache memory (hereafter referred to as CM) 41, a shared memory 35, and a connection part 33.

Since the plurality of CHAs 3A, 3B, . . . may have the same construction and function, the CHA 3A will be described as a typical example of the plurality of CHAs 3A, 3B, . . . . The CHA 3A is an interface device (e.g., a circuit board) which controls communications with the host device 31. The CHA 3A can receive read out requests from the host device 31, produce and transmit messages for the DKAs 13 (e.g., messages indicating which read-out object data is to be read out from which storage 21, and where this data is to be stored in the CM 41 or the like), and read out read-out object data from the CM 41 and transmit this data to the host device on the basis of messages from the DKAs 13 on the basis of read requests from the host device 31 (e.g., massages that read out for CM 41 is completed). An example of the hardware construction of the CHA 3A will be described later.

The storages 21 may be any type of storage device; e.g., hard disks, optical disks, magnetic disks or semiconductor memories may be used.

Since the plurality of DKAs 13A, 13B, . . . may have the same construction and function, a single DKA 13A will be described as a typical example of the plurality of DKAs 13A, 13B, . . . . The DKA 13A is an interface device (e.g., a circuit board) which controls communications with one or more storages 21, 21 . . . that can communicate with this DKA 13A itself. On the basis of messages from the CHAs 3, the DKA 13A may read out write object data from the CM 41 and write this data into the storages 21, and on the basis of messages from the CHA 3, this DKA 13A may read out read-out object data from the storages 21, and write this data into the CM 41. An example of the hardware construction of the DKA 13A will be described later.

The CM 41 is a memory that is used for temporary storage of write object data and read-out object data exchanged between the host device 31 and storages 21.

The shared memory package (e.g., a circuit board) 35 comprises a shared memory (hereafter referred to as SM) 39, and a switching LSI (large-scale integrated circuit) 37. The SM 39 can store various types of information (e.g., control information that is used to control the operation of the storage systems 20), and is a memory that can be accessed by the microprocessors (hereafter referred to as MP) 5 of the respective CHAs 3 and the MPs 15 of the respective DKAs 13. The switching LSI 37 can allow access to the SM 39 by the respective MPs 5 and 15, and can control the writing of messages from the respective MPs 5 and 15 into the local memories (hereafter referred to as LM) 7 and 17 of other MPs 5 and 15, and the writing of this data into the SM 39.

The connection part 33 may be formed as a switch (e.g., a cross-bar that performs data transfer by a switching operation) or bus that connects the respective CHAs 3, CM 41, respective DKAs 13 and switching LSI 37 to each other.

The above has been a description of an outline of the hardware construction of the system of the present example. Next, outlines of examples of the hardware construction of the respective CHAs 3 and respective DKAs 13 will be described. Furthermore, in the following description, information that is exchanged between the CHAs 3 or DKAs 13 and other CHAs 3 and DKAs 13 either with a switching LSI 37 interposed or without the interposition of such a switching LSI 37 will be called "messages". For example, such messages may contain either data or commands, or both.

The CHA 3A will be described as a typical example for the respective CHAs 3. For example, the CHA 3A comprises a port 2A which is connected to the communications network 32, a microprocessor adapter (hereafter referred to as an MPA) 4A which is connected to the connection part 33, an MP 5A, an LM 7A that can be accessed by the MP 5A, and a transfer control circuit 6A that is connected to the port 2A, MP 5A, LM 7A and MPA 4A (in FIG. 1, the branch symbol "B" is attached to constituent elements of the CHA 3B instead of the branch symbol "A"). In this example, one MP 5 is mounted on one CHA 3; however, a plurality of MPs 5 may also be mounted (this is also true of the DKAs 13 described later). Furthermore, in this example, one LM 7 is prepared for one MP 5; however, a plurality of LMs 7 may also be prepared (this is also true of the MPs 15 described later). The transfer control circuit 6A can control the mutual transfer of data among the port 2A, MP 5A, LM 7A and MPA 4A. In concrete terms, for example, the transfer control circuit 6A can output data that is input via the port 2A to at least one part selected from a set consisting of the MP 5A, LM 7A and MPA 4A, and can output data that is input via the MPA 4A to at least one part selected from a set consisting of the MP 5A and LM 7A. The MP 5A can write data into the LM 7A, or read out data from the LM 7A, via the transfer control circuit 6A.

The DKA 13A will be described as a typical example of the respective DKAs 13. The DKA 13A can be constructed with substantially the same construction as the CHA 3A. Specifically, for example, the DKA 13A may comprise a port 12A, MPA 14A, MP 15A, LM 17A and transfer control circuit 16A (in FIG. 1, the branch symbol "B" is attached to the constituent elements of the DKA 13B instead of the branch symbol "A"). For example, a storage 21 is connected to the port 12A via a fiber channel cable.

FIG. 2A shows an outline of one type of processing that is performed in the first example of the present invention. Furthermore, the write messages described later may be transmitted and received by at least one part selected from a set consisting of the MP, transfer control part and MPA; in the following description, however, it will be assumed that these write messages are transmitted and received by the MP.

In this first example, instead of or in addition to writing data into their own LMs 7 and 17 (e.g., substantially simultaneously with this writing), the respective MPs 5 and 15 may write data into a plurality of LMs 7 and 17 corresponding to a plurality of other MPs 5 and 15 (this may be referred to below as "multi LM writing").

Specifically, for example, in cases where the MP 5A of the CHA 3A writes data into the LM 7A, at least one part among the MP 5A, MPA 4A and transfer control circuit 6A may produce a message containing this data (message containing a command to execute multi LM writing; hereafter referred to as a multi LM write message), and may transmit this message to the switching LSI 37. Here, "cases where writing is performed" may refer either to a time prior to the writing of data (e.g., immediately prior to writing), a time following the writing of data, or a time following the writing of data and receiving of a response.

The switching LSI 37 can write data contained in the multi LM write message into a plurality of other LMs 7B and 17A in accordance with this multi LM write message. In concrete terms, for example, the switching LSI 37 can produce a message containing this data (a message containing a command to write this data; hereafter referred to as an ordinary write message), and can respectively transmit the ordinary write message thus produced to the CHA 3B and DKA 13A respectively equipped with the LM 7B and LM 17A (multi LM writing refers to cases where the number of write destination LMs is one or more, while ordinary LM writing refers to cases where the number of write destination LMs is 1). In the CHA 3B (or DKA 13A) that receives the ordinary write message, at least one part among the MP 5B (15A), MPA 4B (14A) and transfer control circuit 6B (16B) can write the data contained in the received ordinary write message into the LM 7B (17A). The MP 5B (15A) can acquire data by reading out data from its own LM 7B (17A).

As one device for realizing the abovementioned scheme, it is conceivable that the respective LMs 7 and 17 of the respective MPs 5 and 15 might be divided as described below, and that information expressing the results of this division (hereafter referred to as an "LM map") might be set in storage resources (e.g., internal registers inside the MPs 5 and 15) in the CHA 3 or DKA 13 equipped with this LM 7 or 17.

FIG. 2B shows an example of the construction of the LM map of the LMs 7 and 17. In FIG. 2B, in order to achieve a correspondence with FIG. 2A, LM maps 71A, 71B and 73A for the LMs 7A, 7B and 17A are described as typical examples.

The LM maps 71A, 71B and 73A respectively express the division results of the LMs 7A, 7B and 17A.

According to these division results, the same addresses of the LMs 7A, 7B and 17A are assigned to the specified MP 5 or 15. In concrete terms, for example, the respective storage regions corresponding to the address "0" of the LMs 7A, 7B and 17A are assigned as write regions for the MP 5A, the respective storage regions corresponding to the address "1" are assigned as write regions for the MP 5B, and the respective storage regions corresponding to the address "2" are assigned as write regions for the MP 15A.

Thus, the storage regions of the respective addresses (e.g., "0") are write regions for the MPs 5 and 15 (e.g., 5A) to which the storage regions of these addresses are assigned, in any of the LMs 7A, 7B and 17A.

However, for other MPs 5 and 15 (e.g., 5B and 15A), thse write regions are read-out regions. Accordingly, the other MPs 5 and 15 (e.g., 5B and 15A) can read out data from the storage regions of the addresses (e.g., "0") assigned to the MPs 5 and 15 (e.g., 5A), and can therefore acquire data from the MPs 5 and 15 (e.g., 5A).

Such LM maps can be set in places that allow reference by the corresponding processors (e.g., internal registers in the processors). Furthermore, in addition to the abovementioned information, information that indicates which LM of which MP data will be written into if data is written into the address in question can also be registered in these places. As a result, the MPs 5 and 15 can select write regions corresponding to the sending destination MPs 5 and 15 from the plurality of write regions of their own LMs 7 and 17 in accordance with the other MPs 5 and 15 to which data is sent, write data into the selected write regions, and transmit write messages containing the addresses of the selected write regions to the switching LSI 37.

Thus, for all of the LMs 5 and 15, storage regions of the same respective addresses (these may be the same in terms of meaning even if the values are different due to offset or the like) are assigned as write regions of one MP 5 or 15. For the respective MPs 5 and 15, the storage regions corresponding to addresses other than the addresses assigned to these MPs themselves in their own LMs 5 and 15 are assigned as read-out regions. As a result, the multi LM writing shown as an example in FIG. 2A can be realized.

Specifically, for example, in a case where the MP 5A writes data into the storage region corresponding to the address "0" of the LM 7A, at least one of the parts among the MP 5A, MPA 4A and transfer control circuit 6A can produce a multi LM write message containing this data and the address "0", and can transmit this message to the switching LSI 37.

The switching LSI 37 can produce an ordinary write message containing the data and address "0" contained in the multi LM write message, and can transmit this ordinary write message to the CHA 3B and DKA 13A.

In the CHA 3B (or DKA 13A) that receives this ordinary write message, at least one of the parts among the MP 5B (15A), MPA 4B (14A) and transfer control circuit 6B (16B) can write the data contained in the received ordinary write message into the storage region (storage region of the LM 7B (17A)) of the address "0" contained in the ordinary write message. By reading out the data from the storage region of the address "0" of its own LM 7B (17A) (e.g., by polling the read-out region of the address "0"), the MP 5B (15A) can acquire data from the MP 5A.

For instance, the respective CHAs 3A, respective DKAs 13 and switching LSI 37 can exchange messages of the construction shown for example in FIG. 3A with each other.

FIG. 3A shows an example of the construction of the messages that are exchanged among the respective CHAs 3, respective DKAs 13 and switching LSI 37.

The reference number 281 indicates a write message that is used in cases where writing is commanded. This message 281 has an address field 281A in which information indicating the address is set, a command field 281B in which a command is set, a data field 281C in which the data that is the object of writing is set, and a code field 281D in which an error correction code, error checking code or the like is set. At least one of the fields 281A through 281D may have either a fixed length (e.g., 8 bits) or a variable length (the same is true of the various other types of fields described later). Furthermore, commands that can be set in the field 281B may include commands that indicate the type of writing in addition to the fact that the command is a write command. For instance, types of writing include multi LM writing (where the number of writing destination LMs is one or more), ordinary writing (where the number of writing destination LMs is 1), SM writing and the like. Accordingly, for example, a message 281 containing a command that indicates multi LM writing is the abovementioned multi LM write message, while a message 281 containing a command that indicates ordinary writing is the abovementioned ordinary write message.

The reference number 283 indicates a write response message to the write message 281. This message 283 has a status field 283A in which status information that expresses the status (e.g., writing success or writing failure) is set, and a code field 283B in which an error correction code or the like is set.

The switching LSI 37 can receive write messages 281 from the respective CHAs 3 and respective DKAs 13, and can transmit write response messages 283 as responses to these write messages 281 to the CHAs 3 or DKAs 13 that are the transmission sources of these write messages 281.

FIG. 3B shows an outline of one example of the hardware construction of the switching LSI 37.

The switching LSI 37 may comprise a communications part 51, an interface device for the SM 39 (hereafter referred to as the SM I/F) 54, an address map storage region (e.g., register) 52 which stores an address map 55, an address state storage region 57, a queue 59, and a control part 53.

For example, the communications part 51 is an interface device for the connection part 33. For instance, the communications part 51 can receive messages 281 or 283 from the respective CHAs 3 and respective DKAs 13 via the connection part 33, and can transfer these received messages 281 or 283 to the control part 53. Furthermore, for example, the communications part 51 can receive messages 281 or 283 from the control part 53, and can transmit the received messages 281 or 283 to the respective CHAs 3 and respective DKAs 13 via the connection part 33.

The address map 55 will be described with reference to FIG. 4. Where in which LMs data is written when which addresses of the LMs 7 and 17 are designated is recorded in the address map 55. For example, sending destination information indicating the sending destinations of data is associated with the respective addresses in the address map 55. For instance, this sending destination information includes a plurality of transmission yes-or-no flags (flags indicating whether or not to send data) respectively corresponding to the plurality of MPs 5 and 15. Furthermore, information indicating the CHA 3 or DKA 13 on which the MP is mounted is also recorded in the address map 55 for each MP 5 and 15. Multi LM writing can be executed using such an address map 55 and the abovementioned LM maps 71A through 71C set for each CHA 3 and DKA 13 (see FIG. 2B) (the concrete processing flow will be described later).

Reference is again made to FIG. 3B. The address state storage region 57 can store information indicating which addresses of the LMs 7 and 17 are in what states. In concrete terms, for example, the address state storage region 57 can store information indicating which of the addresses of the LMs 7 and 17 (hereafter referred to as "LM addresses" in some cases) are in a locked-on state (in other words, are in a state of exclusion). For example, this can be realized by preparing a flag used to indicate whether or not the LM address is in a locked-on state for each LM address, or by storing the LM addresses that are in a locked-on state.

The queue 59 can store unprocessed multi LM write messages.

The control part 53 can control the operation of the switching LSI 37. The control part 53 can be realized by means of hardware, computer programs or a combination of both (e.g., a CPU). The control part 53 receives write messages 281 issued by the CHAs 3 or DKAs 13 via the communications part 51. The control part 53 can judge whether the received write message 281 is a multi LM write message, ordinary LM write message or SM write message by interpreting the command contained in this write message 281. In cases where the control part 53 judges that the write message is an ordinary write message, the control part 53 can transmit a write message 281 containing the data contained in the ordinary LM write message to the CHA 3 or DKA 13 that has the destination (e.g., MP specified by an address, MP number or the like) specified by this ordinary LM write message. In cases where the control part 53 judges that the write message is an SM write message, the control part 53 can write the data in this SM write message into the SM 39 via the SM I/[F] 54. In cases where the control part 53 judges that the write message is an ordinary LM write message, the control part 53 can execute the processing shown for example in FIG. 5.

Figure 5:
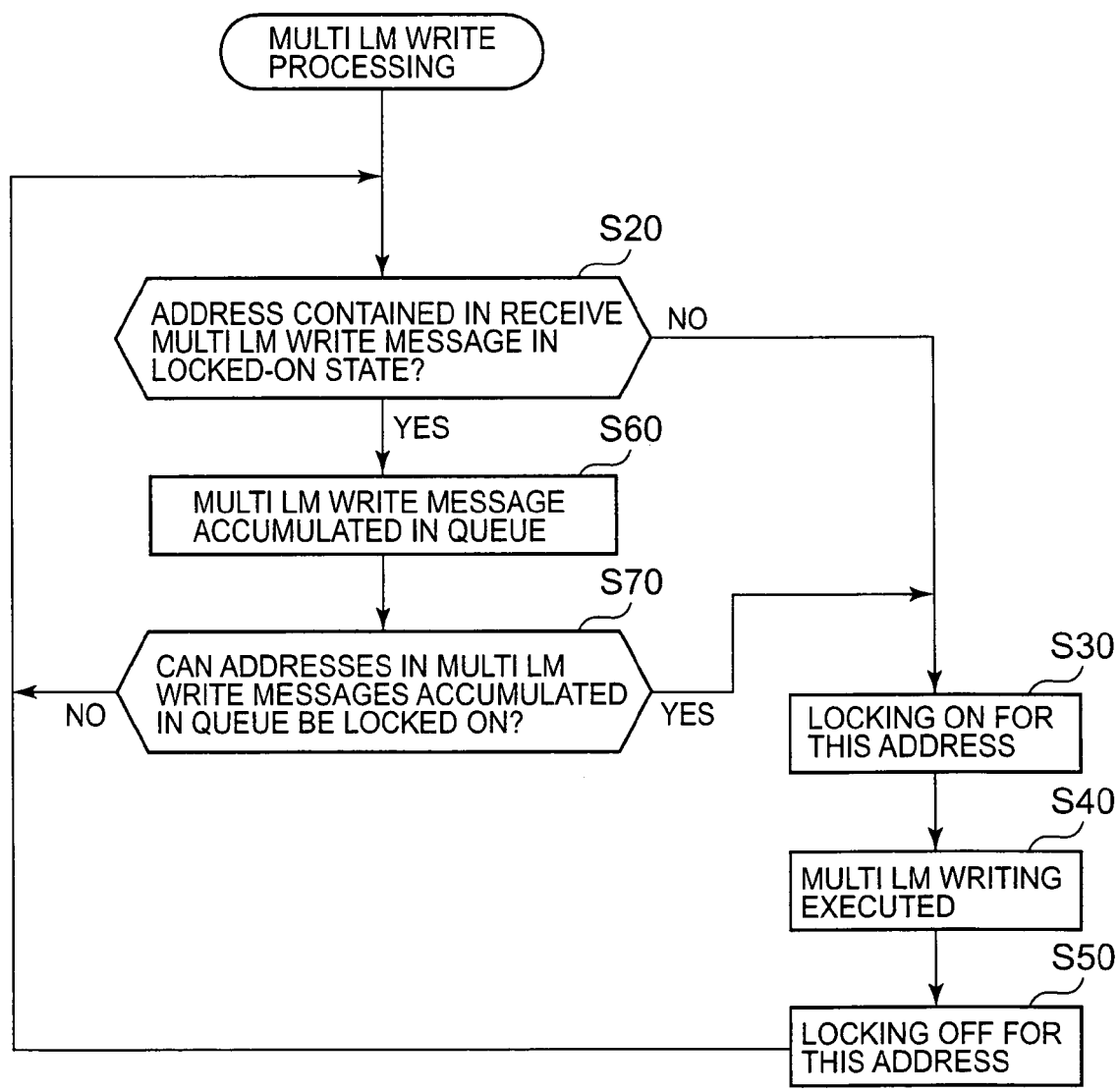
FIG. 5 shows one example of the flow of the processing that is performed by the control part 53 in cases where it is judged that the received write message is a multi LM write message.

FIG. 5 shows one example of the flow of the processing that is performed by the control part 53 in cases where it is judged that the received write message is a multi LM write message.

By referring to the address state storage region 57, the control part 53 judges whether or not the LM addresses in the multi LM write message are in a locked-on state (step S20).

That the LM addresses are in a locked-on state means that the LM addresses in the multi LM write message are in a state of exclusion, so that the multi LM write message cannot be processed. Accordingly, in cases where it is judged in S20 that that the state is a locked-on state (YES in S20), the control part 53 accumulates the multi LM write message in the queue 59 (S60). Subsequently, by referring to the address state storage region 57, the control part 53 performs a judgment as to whether or not it has become possible for the LM addresses in the multi LM write messages accumulated in the queue 59 to be locked on (S70). In cases where the control part 53 judges that locking on has become possible (YES in S70), the control part 53 performs the processing of S30 described later for the multi LM write message for which this judgment has been made, and in cases where the control part 53 judges that locking on has not become possible (NO in S70), the control part 53 again performs the processing of S20.

In cases where it is judged in S20 that the state is not a locked-on state (NO in S20), the control part 53 writes an indication that the LM addresses in the multi LM write message that is the object of processing are locked on into the address state storage region 57 (S30).

Then, the control part 53 performs the processing of the multi LM write message (S40). In concrete terms, the control part 53 can refer to the address map 55, specify the sending destination MPs 5 and 15 corresponding to the LM addresses in the multi LM write message that is the object of processing, and produce and transmit a write message containing the LM address for each of the specified sending destination MPs 5 and 15.

Following S40, the control part 53 performs a locking-off operation for the LM addresses (S50). For example, the control part 53 accesses the address state storage region 57, and cancels the locked-on state of the LM addresses.

The above is one example of the flow of the processing that is performed by the control part 53 in cases where it is judged that the received write message is a multi LM write message.

As was already described above, the control part 53 can perform exclusive processing for the respective LM addresses. As a result, the order of the data written into the respective LM addresses can be maintained. In other words, a situation in which data issued later is written into the LM address region before data issued earlier can be prevented.

Figure 6A:
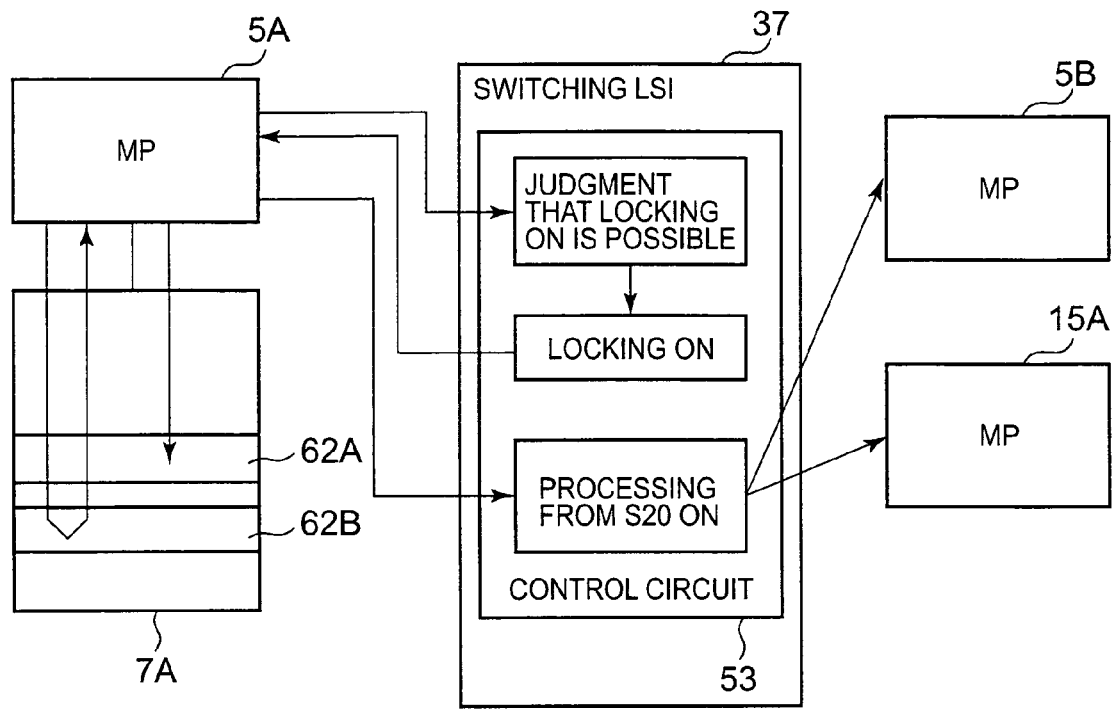
FIG. 6A is a diagram used to illustrate one example of the LM address exclusive processing.

Below, one example of the exclusive processing of LM addresses will be described with reference to FIG. 6A.

In cases where the MP 5A reads out data from a certain read-out region 62B of its own LM 7A (in concrete terms, for example, when the MP 5A detects that data has been written into this read-out region), the MP 5A can send a request to the switching LSI 37 for locking on with respect to the LM address of this read-out region 62B.

In response to this request, the control part 53 of the switching LSI 37 can refer to the address state storage region 57, judge whether or not this LM address can be locked on, and send notification as to whether or not locking on is possible to the MP 5A that is the source of the lock-on request.

In cases where the MP 5A receives notification that locking on has been accomplished, the MP 5A can read out data from the read-out region 62B (in cases where the MP 5A receives notification that locking on could not be accomplished, the MP 5A does not read out data, and may again issue a lock-on request). Subsequently, furthermore the MP 5A can write data into the write region 62A of its own LM 7A, and can transmit a multi LM write message containing the address of the write region 62A and the abovementioned data to the switching LSI 37. In cases where the control part 53 of the switching LSI 37 receives such a multi LM write message, this control part 53 can perform the processing from S20 on described with reference to FIG. 5. In this case, furthermore, for example, the control part 53 can perform LM address lock-off at any of the following timings (1) through (3): (1) when a write message is transmitted to the sending destination MP, (2) when a lock-off request is received from the sending source MP, and (3) when a response to a transmitted write message is received from the sending destination MP.

Thus, in cases where data is read out from the respective LM addresses, these LM addresses are placed in a locked-on state; accordingly, the overwriting of such data by other data before this data is read out can be prevented.

Figure 6B:
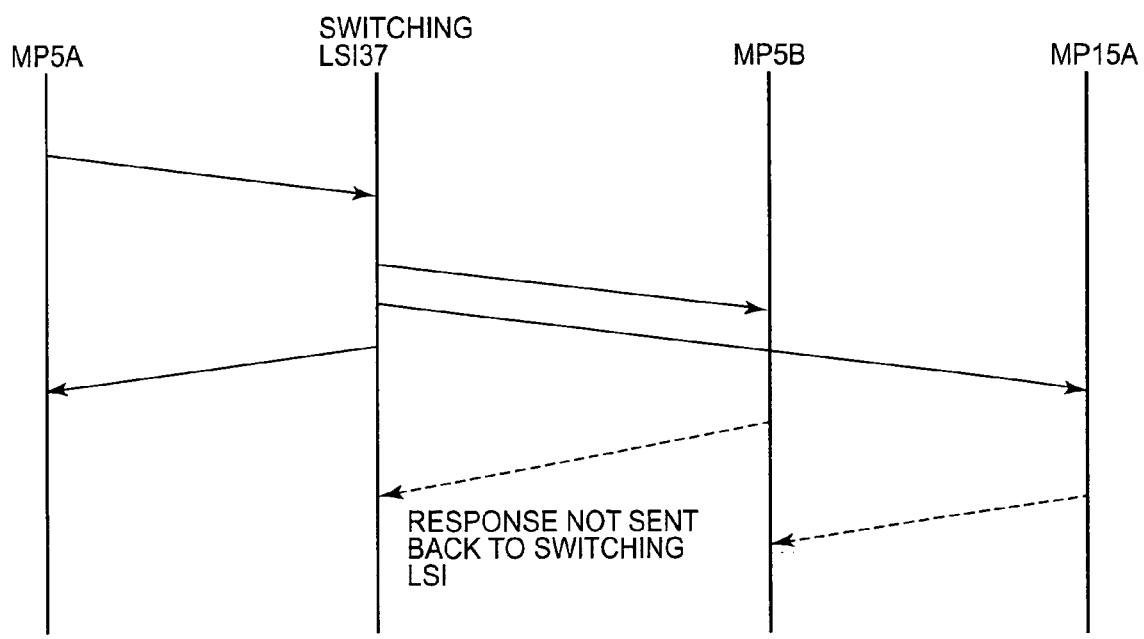
FIG. 6B is an explanatory diagram of one example of the response system that is performed by the switching LSI 37 with respect to the sending destination MP.

In cases where a multi LM write message is transmitted, and write messages are transmitted to a plurality of sending destinations in accordance with this message, the switching LSI 37 or sending destination MPs can send back a response as shown for example below. Below, the MP 5A will be described as the sending source MP, and the MP 5B and MP 15A will be described as the sending destination MP, with reference to FIG. 6B.

In cases where the switching LSI 37 receives a multi LM write message from the MP 5A, and transmits respective write messages to the sending destination MPs 5B and 15A, the switching LSI 37 transmits a response to the MP 5A. The sending destination MPs 5B and 15A do not send back a response to the switching LSI 37 for the write messages from the switching LSI 137.

By doing this, it is possible to minimize the time from the transmission of a multi LM write message by the MP 5A to the reception of a response. This would appear to be effective in a connection type exchange (in other words, in communications by a system in which the path is occupied from the time of transmission until a response is received).

The above has been a description of a first example of a first embodiment of the present invention. Furthermore, in this first example, the following can also be performed.

Figure 7A:
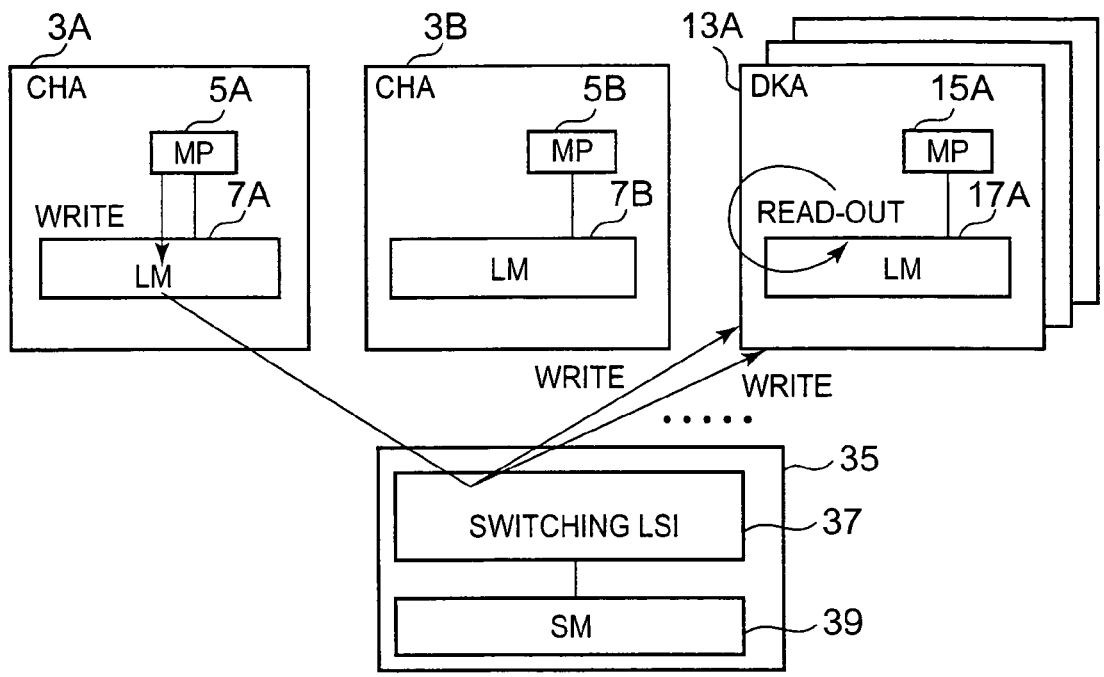
FIG. 7A is a diagram used to illustrate that the write destinations in multi LM write processing can be formed into group units.

Specifically, as is shown for example in FIG. 7A, the sending destinations of data in the multi LM write message can be distinguished in group units.

In concrete terms, for example, by setting all of the MPs 15 present in all of the DKAs 12 as sending destinations in the address map 55 as in the case of the LM addresses Nos. "13" through "16" of the address map 55 shown for example in FIG. 4 (in other words, by preparing LM addresses in which the sending destinations are DKA groups), it is possible to write the data into the LMs 17 of all of the MPs 15 of all of the DKAs 13 (as shown for example in FIG. 7A) in cases where data is written into any of the LM addresses Nos. "13" through "16". Here, data can be transmitted and received among the DKAs 15 by assigning the respective LM addresses Nos. "13" through "16" to the MPs 15 of the DKAs 15.

Similarly, for example, by setting all of the MPs 5 present in all of the CHAs 3 as sending destinations in the address map 55 as in the case of the LM addresses of Nos. "9" through "12" of the address map 55 shown for example in FIG. 4, it is possible to write the data into the LMs 7 of all of the MPs 5 of all of the CHAs 3 in cases where data is written into any of the LM addresses Nos. "9" through "12".

Thus, the sending destinations of the data in the multi LM write message can be set as group units according to the setting of the sending destinations in the address map 55. Groups are not limited a plurality of MPs 5 of a plurality of CHAs 3, or a plurality of MPs 15 of a plurality of DKAs 13; for example, such groups may consist of a plurality of MPs that form a cluster, a plurality of MPs that perform specified copying processing (e.g., processing that performs remote copying into other storage systems), a plurality of relatively free MPs (MPs in CHAs 3) that are not connected to the host device 31, a plurality of MPs (MPs in DKAs 13) that produce parity data on the basis of the RAID (redundant array of inexpensive disks) level or the like.

Figure 7B:
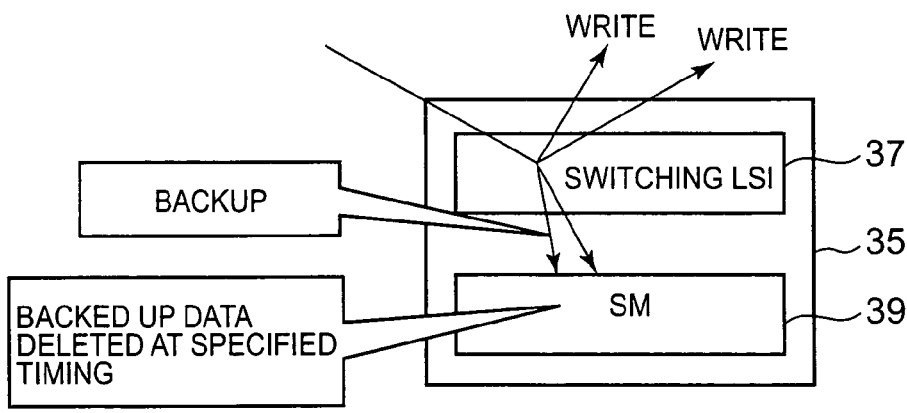
FIG. 7B is a diagram used to illustrate how the data that is the object of multi LM writing is also written into the SM 39.

As is shown in FIG. 7B, the switching LSI 37 can also write data contained in a multi LM write message (or ordinary write message) into the SM 39. In concrete terms, for example, in cases where backup commands are contained in the multi LM write message (or in an ordinary write message), the switching LSI 37 can write the data contained in this multi LM write message (or ordinary write message) into the SM 39. Furthermore, for example, in cases where the adoption of backup is set beforehand, the switching LSI 37 can write the data contained in all multi LM write message (or all ordinary write messages) into the SM 39.

Furthermore, the switching LSI 37 can delete the data contained in multi LM write messages (or ordinary write messages) among the data written into the SM 39 at a specified timing. In concrete terms, for example, in cases where the region of the SM 39 used to leave data backup becomes full, the switching LSI 37 can delete the oldest data. Furthermore, for example, in cases where the switching LSI 37 receives a response to a write message sent to the sending destination MP, or in cases where a response to a multi LM write message (or ordinary write message) is sent back, the switching LSI 37 can delete data in the write message relating to this response from the SM 39. Furthermore, for example, in cases where the switching LSI 37 newly receives data for a certain LM address that is to be written into this LM address next, the switching LSI 37 can delete the data written immediately before from the SM 39, and can write this newly received data into the SM 39.

Thus, by adopting backup in the SM 39 (especially in a specified region of this SM 39), it is possible (for example) in cases where trouble occurs prior to the writing of data into the LMs 7 or 17 of the sending destination MPs 5 or 15 or the like for the respective MPs 5 or 15 to accomplish recovery from this trouble by acquiring backup data accumulated in the SM 39.

Figure 7C:
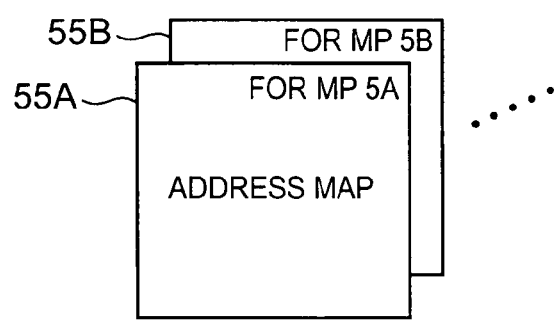
FIG. 7C shows one example of the address map that is prepared for each transmission source.

As is shown for example in FIG. 7C, address maps 55A, 55B, . . . can be stored for each sending destination of the write messages in the address map storage region 52. As a result, the sending destination may be varied according to the sending source. In concrete terms, for example, the sending destination of the data may be varied according to the sending source of the write message even in cases where data is written into the same LM address.

Thus, in the first example described above, in cases where a certain MP 5 or 15 writes data into the write region of its own LM 7 or 17, a multi LM write message containing the data and the LM address of this write region can be transmitted to the switching LSI 37, and the switching LSI 37 can transmit a write message containing this data to a plurality of sending destinations associated with this LM address; as a result, the same data can be written into regions with the same LM address in a plurality of LMs 7 and 17 at a plurality of sending destinations. By referring to the read-out regions of their own LMs 7 and 17, the MPs 5 and 15 at the respective sending destinations can acquire data transmitted from the sending source. As a result, it is not necessary for the plurality of MPs 5 and 15 to access the SM 39 in order to acquire data from the sending source; accordingly, a drop in the processing performance of the plurality of MPs 5 and 15 can be prevented.

EXAMPLE 2

A second example of the first embodiment of the present invention will be described below. Below, furthermore, mainly points of difference from the first example will be described; a description of points that are the same as in the first example will be omitted or abbreviated.

In the abovementioned first example, communications between the respective MPs 5 and 15 and the switching LSI were accomplished by connection type communications; in this second example, on the other hand, connectionless type communications are used. For example, connectionless type communications can be realized by performing a duplex transfer in which the transmission path and reception path are separated.

Figure 8:
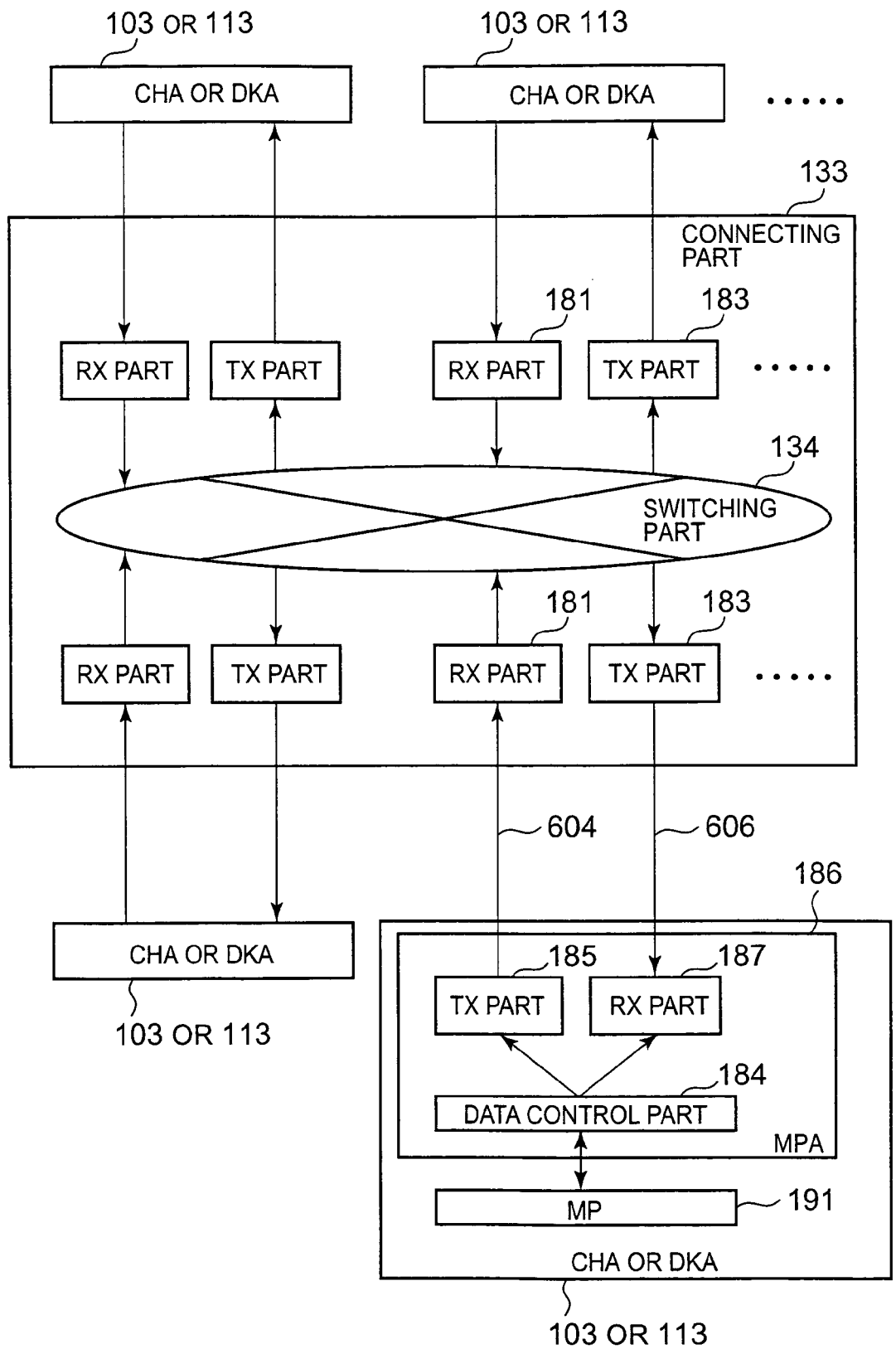
FIG. 8 shows the path construction between the CHAs 103 (or DKAs 113) and the connection part 133 in a second example of the first embodiment of the present invention.

FIG. 8 shows the construction of the path between the CHAs 103 (or DKAs 113) and the connection part 133 in this second example of the first embodiment of the present invention.

The respective CHAs 103 (or DKAs 113) and the connection part 133 are connected by one or more first paths 604 and one or more second paths 606.

A transmitting part (hereafter referred to as a TX part) 185 which is connected to the first path 604, a receiving part (hereafter referred to as an RX part) 187 which is connected to the second path 606, and a data control part 184 which is interposed between the TX part 185 and receiving part 187 and the MP side (e.g., in the part containing the MP 105 (or 115) or the transfer control circuit) are disposed in the MPA 186 of each CHA 103 a (or DKA 113). The TX part 185 can receive data from the side of the MP 105 (or 115) via the data control part 184, and transmit the received data via the first path 604. The RX part 187 can transmit data received from the connection part 133 via the second path 606 to the MP side via the data control part 184. For example, a TX part 185 and an RX part 187 may be disposed for each LM of each MP.

The connection part 134 may comprise an RX part 181 that is connected to the first path 604 and a TX part 183 that is connected to the second path 606 for each CHA 103 and DKA 113. Furthermore, the connection part 134 may also comprise a switching part 134 which is connected to each RX part 181 and each TX part 183. The switching part 134 can receive data from the RX part 181, and can transfer data received from the RX part 181 to a TX part 183 that can transmit this data to the destination of said data.

Figure 9:
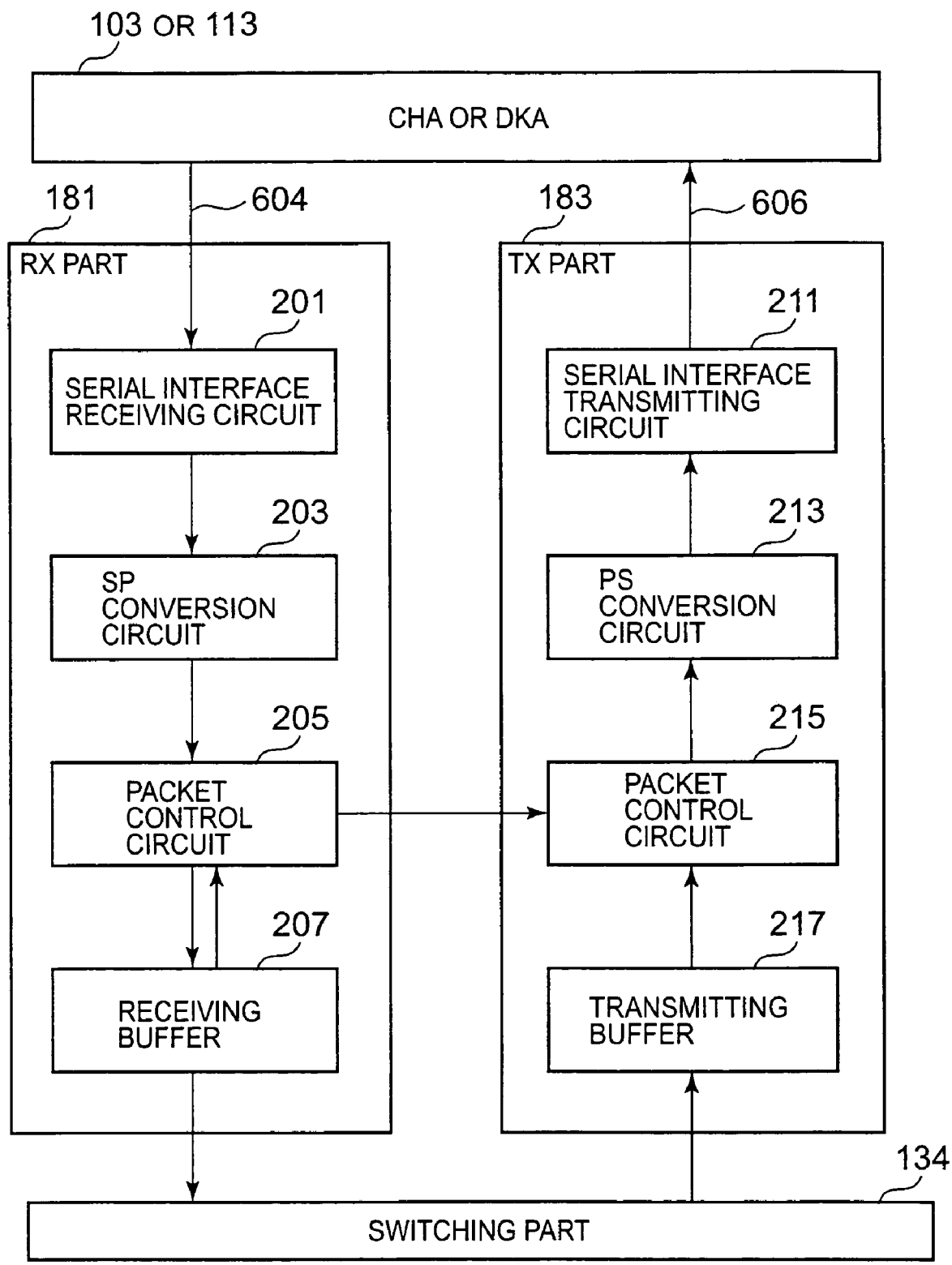
FIG. 9 shows an example of the construction of the RX part 181 and TX part 183 of the connection part 133.

FIG. 9 shows examples of construction of the RX part 181 and TX part 183 of the connection part 133. Furthermore, this example of construction of the RX part 181 can also be applied to the RX part 187 of each CHA 103 (or DKA 113), and this example of construction of the TX part 183 can also be applied to the TX part 185 of each CHA 103 (or DKA 113).

The RX part 181 may comprise a serial interface receiving circuit 201 that receives serial data and outputs this data to the downstream side, an SP conversion circuit 203 that receives the output serial data, converts this data into parallel data, and outputs the parallel data, a packet control circuit 205 that receives the output parallel data (data packets), and a receiving buffer 207. The packet control circuit 205 can accumulate the received parallel data in the receiving buffer 207, and, if the receiving buffer 207 is full, can send a "full" notification indicating this (e.g., the received parallel data itself) to the packet control circuit 215 of the TX part 183.

The TX part 183 can comprise a transmission buffer 217 which accumulates parallel data from the switching part 134, a packet control circuit 215 which receives and outputs parallel data accumulated in the transmission buffer 217 (or a "full" notification transferred from the RX part 181), a PS conversion circuit 213 which converts parallel data received from the packet control circuit 215 into serial data and outputs this serial data, and a serial interface transmission circuit 211 which receives the serial data output from the PS conversion circuit 213 and transmits this serial data to the CHAs 103 (or DKAs 113).

Figure 10:
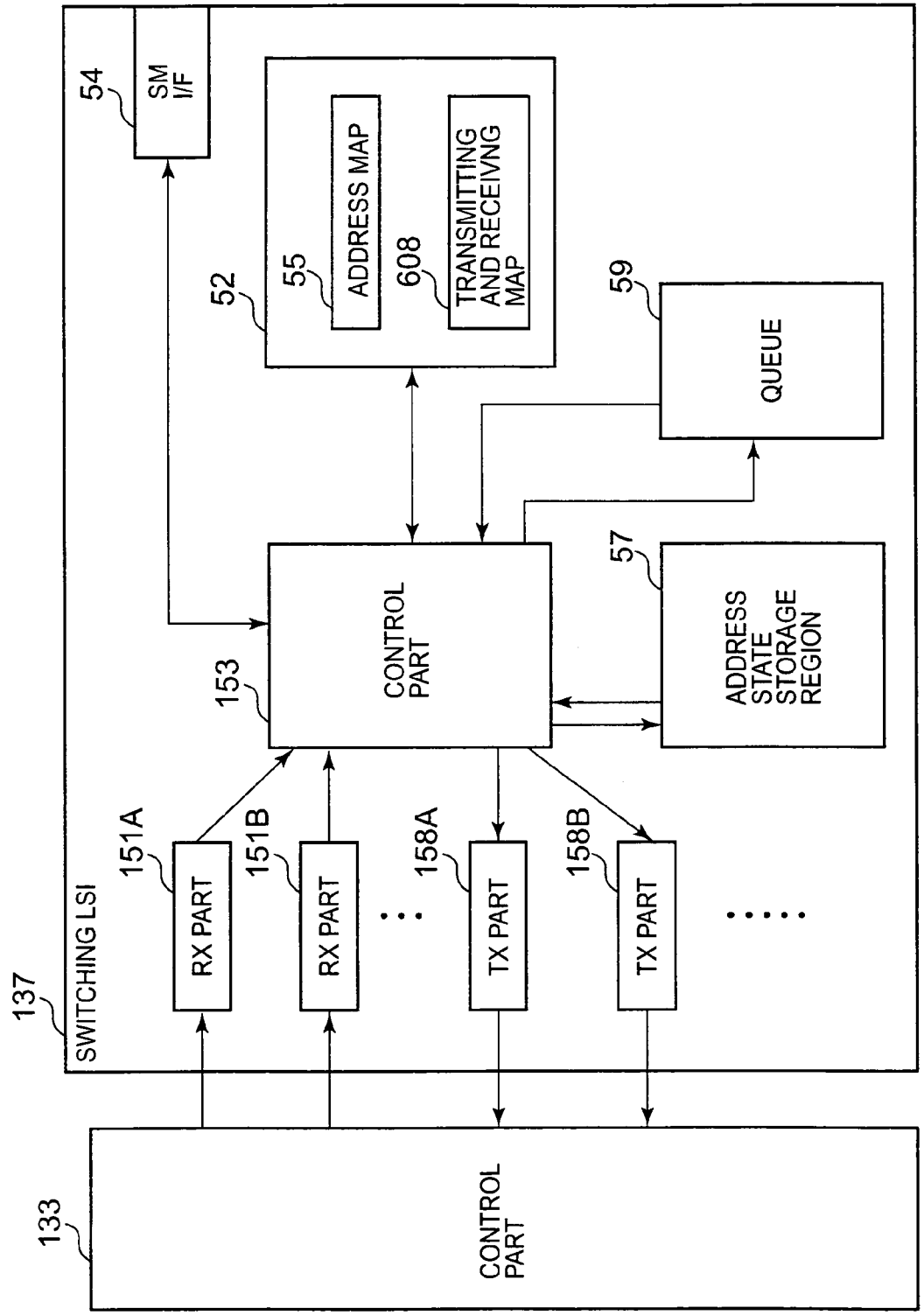
FIG. 10 shows an example of the construction of the switching LSI 37 in a second example of the first embodiment of the present invention.

FIG. 10 an example of the construction of the switching LSI 137 in the second example of the first embodiment of the present invention.

In this second example, a plurality of RX parts 151A, 151B, . . . and a plurality of TX parts 158A, 158B, . . . are disposed between the control circuit 153 and connection part 133. The abovementioned example of construction of the RX part 181 an be applied to the constructions of the respective RX parts 151. The abovementioned example of construction of the TX part 183 can be applied to the constructions of the respective TX parts 158.

The RX parts 151 and TX parts 158 can be installed for the respective LMs of the respective MPs. Furthermore, for example, a transmitting and receiving map 608 that expresses the correspondence of the IDs (e.g., numbers) of the respective RX parts 151, the IDs of the respective TX parts 158 and the respective MPs can be stored in a storage resource such as the address map storage region 52 or the like. As a result, for example, the control part 153 can specify the MP from which a write message is sent according to the RX part 151 via which this write message is received, and can specify the TX part 158 via which the write message can be transmitted in cases where this write message is to be transmitted to a given MP. In concrete terms, for example, the control part 153 can receive a multi LM write message, refer to the abovementioned transmitting and receiving map 608 in cases where a plurality of sending destination MPs corresponding to the LM address contained in this multi LM write message are specified by the address map 55, specify a plurality of TX parts 158 corresponding to the plurality of sending destination MPs, and transmit a write message containing the data in the multi LM write message from the plurality of specified TX parts 158.

In this second example, the switching LSI 137 can send back a response to the sending source MP of the multi LM write message using the response system described below. Furthermore, in the following description, the MP 105A will be taken as the sending source MP, and the MP 105B and MP 115A will be taken as the sending destination MPs.

Figure 11A:
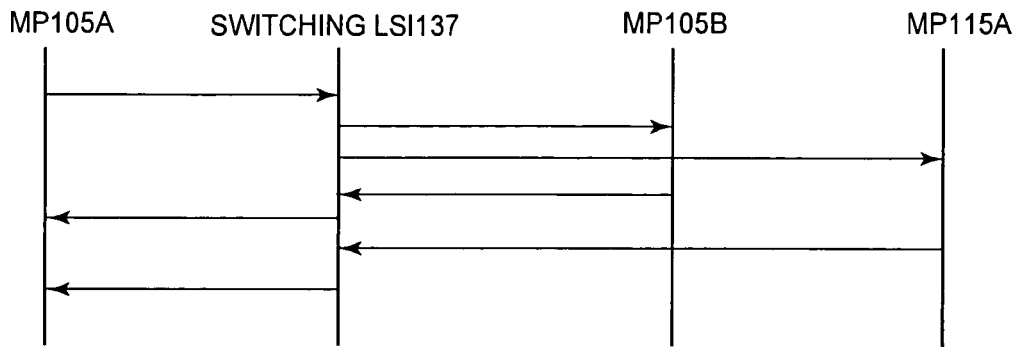
FIG. 11A is an explanatory diagram of the first response system.

FIG. 11A is an explanatory diagram of the first response system.

In cases where the switching LSI 137 transmits a write message to the MP 105B and MP 115A in accordance with a multi LM write message from the MP 105A, the switching LSI 137 receives a response from the MP 105B and MP 115A. For example, this response can be a response that is sent when the MPAs of the sending destination MPs 105B and 115A receive a write message.

In the case of this first response system, the switching LSI 137 can send back a response to the MP 105A each time that a response is respectively received from the sending destination MPs 105B and 115A. As a result, the sending source MP 105A can confirm that data has been delivered to the sending destination.

Figure 11B:
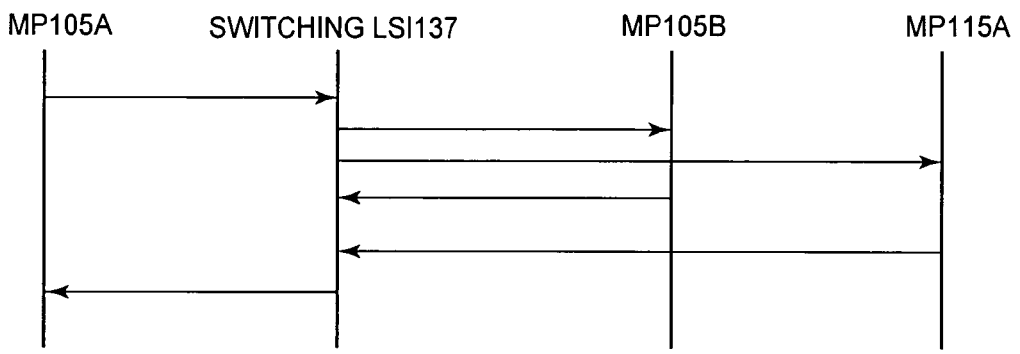
FIG. 11B is an explanatory diagram of the second response system.

FIG. 11B is an explanatory diagram of the second response system.

In this second response system, the switching LSI 137 can send back a response to the sending source MP 105A when the switching LSI 137 receives all of the responses respectively corresponding to all of the sending destination MPs 105B and 115A (i.e., when it is confirmed that all of the responses have been accumulated in a specified buffer). As a result, the sending source MP 105A can confirm that data has been delivered to the sending destination. Furthermore, since the response that is sent back to the sending source MP 105A for all of the responses from all of the sending destinations is a single response, the occupation rate of the path between the sending source MP 105A and switching LSI 137 can be reduced.

Figure 11C:
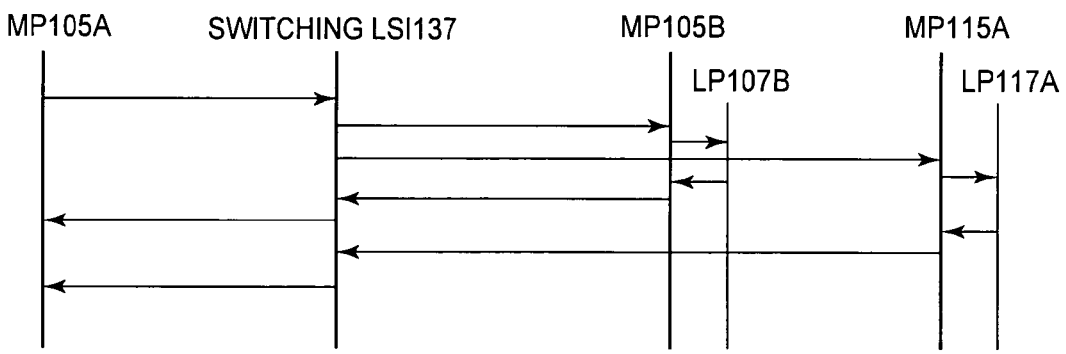
FIG. 11C is an explanatory diagram of the third response system.

FIG. 11C is an explanatory diagram of the third response system.

In this third response system, the responses to the switching LSI 137 from the respective sending destination MPs 105B and 115A are sent back when it is confirmed that data has been written into the LMs 107B and 117A. The switching LSI 137 can send back a response to the MP 105A each time that the switching LSI 137 receives a respective response from the sending destination MPs 105B and 115A. As a result, the sending source MP 105A can confirm that data has been written into the sending destination LMs.

Figure 11D:
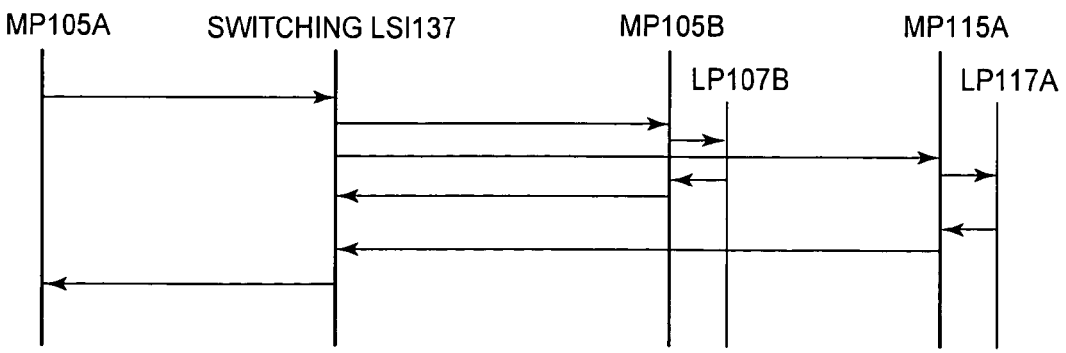
FIG. 11D is an explanatory diagram of the fourth response system.

FIG. 11D is an explanatory diagram of the fourth response system.

IN this fourth response system, the switching LSI 137 in the abovementioned third response system can send back a response to sending source MP 105A when the switching LSI 137 receives all of the responses respectively corresponding to all of the sending destination MPs 105B and 115A. As a result, the sending source MP 105A can confirm that data has been written into all of the sending destination LMs; furthermore, since the response that is sent back to the sending source MP 105A for all of the responses from all of the sending destinations is a single response, the occupation rate of the path between the sending source MP 105A and switching LSI 137 can be reduced.

Figure 12:
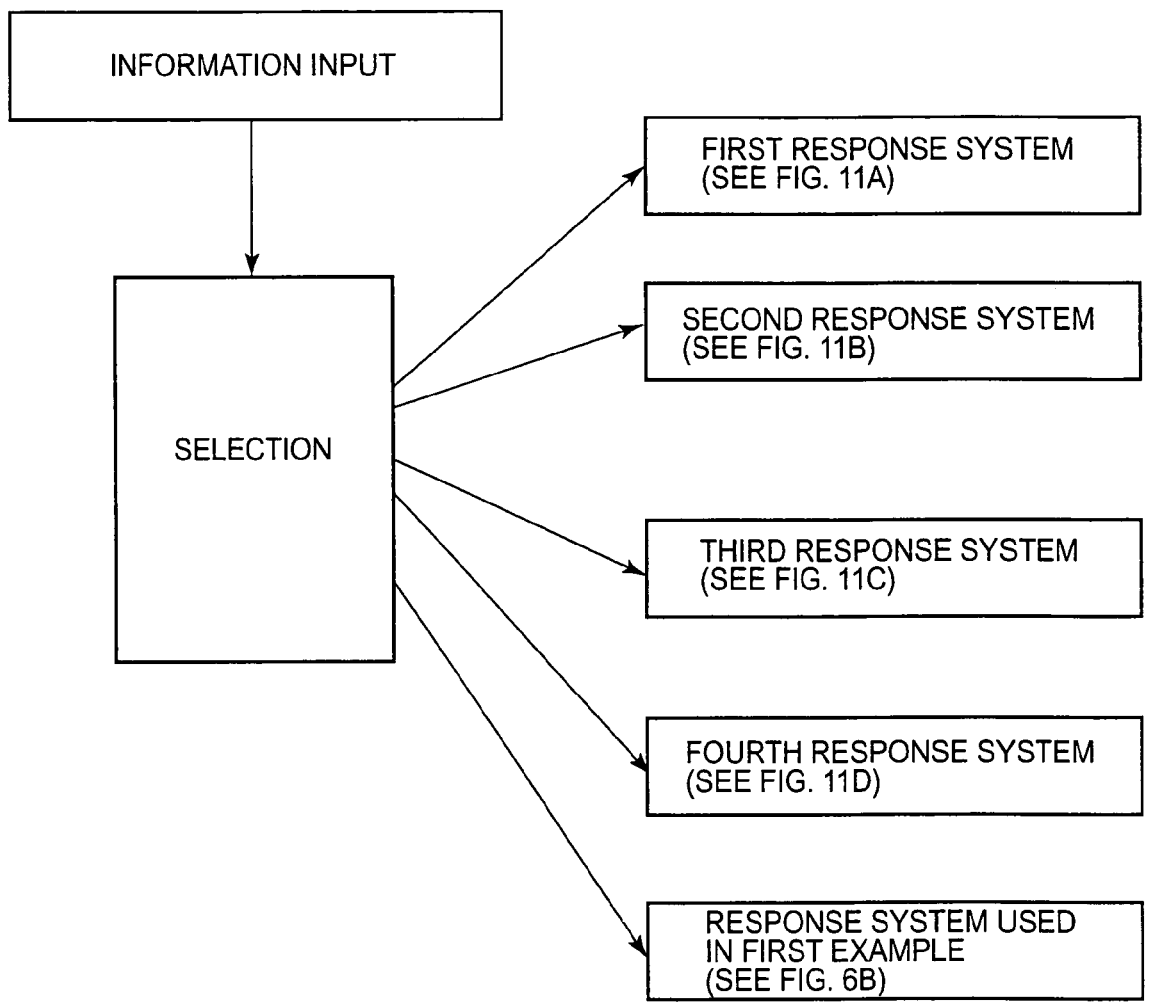
FIG. 12 is a diagram used to illustrate that a plurality of response systems can be selected.

Among the abovementioned first through fourth response systems, it would appear that the second response system or fourth response system is more desirable in this second example. Furthermore, at least one of the first through fourth response systems can be applied in the first example. Furthermore, in this second example, the response system that is used among the first through fourth response systems and the response system described in the abovementioned first embodiment can be dynamically altered by switching LSI 137. For instance, as is shown for example in FIG. 12, in cases where certain information is input, any of a plurality of response systems can be selected on the basis of this information by switching LSI 137. For example, this information may be at least one of a plurality of elements selected from a set consisting of the importance of the data, the path occupation rate and the response time length, or the priority of a plurality of elements or the like. Alternatively, at least one information element contained in this input information can also be included in the multi LM write message. For example, in cases where the switching LSI 137 judges (in accordance with the input information) that the reliability of the data is of no concern, and that the packet occupation rate and response time length have priority at the third level (with the first and second levels being higher), the response system of the first example may be selected. Furthermore, for example, in cases where the switching LSI 137 judges (in accordance with the input information) that the reliability of the data has priority at the second level, that the packet occupation rate is of no concern, and that the response time length has priority at the third level, the first response system can be selected. Furthermore, for example, in cases where the switching LSI 137 judges (in accordance with the input information) that the reliability of the data has priority at the second level, and that the packet occupation rate and response time length have priority at the third level, the second response system can be selected. Furthermore, in cases where the switching LSI 137 judges (in accordance with the input information) that the reliability of the data has priority at the first level, and that the packet occupation rate and response time length are of no concern, the third response system can be selected. Furthermore, in cases where the switching LSI 137 judges (in accordance with the input information) that reliability of the data has a priority at the first level, that the packet occupation rate has a priority at the second level, and that the response time length is of no concern, the fourth response system can be selected. By performing such a selection, it is possible to satisfy the requirements of both data reliability and throughput level in a well-balanced manner.

In this second example, since the paths are separated for transmission and reception, the throughput of multi LM writing can be increased.

EXAMPLE 3

Figure 13A:
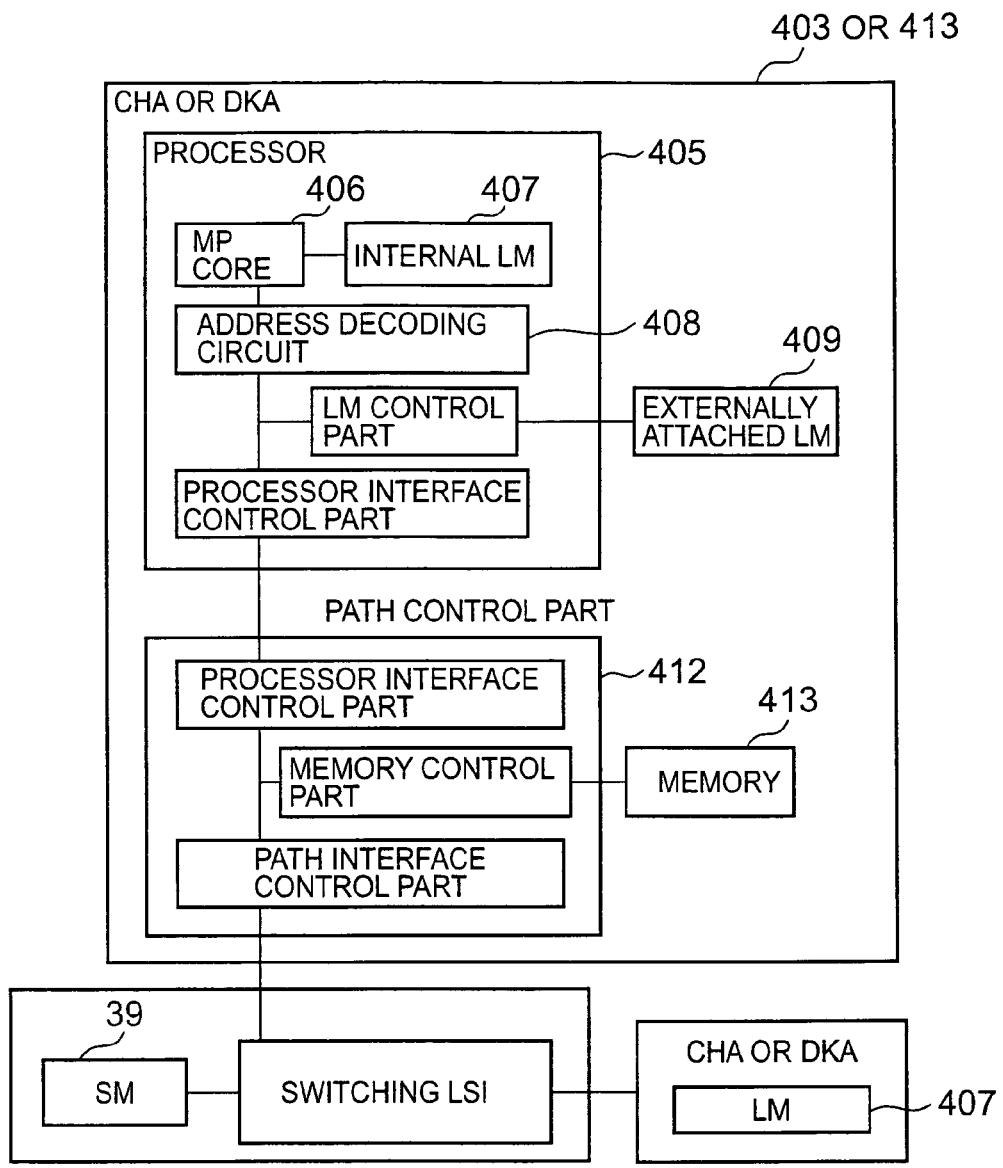
FIG. 13A shows an example of the construction of the CHAs 403 (or DKAs 413) in a third example of the first embodiment of the present invention.

FIG. 13A shows an example of the construction of the CHAs 403 (or DKAs 413) in a third example of the first embodiment of the present invention.

In the abovementioned first example and second example, the respective MPs write data into the write regions of their own LMs, so that LM write messages containing this data are prepared and transmitted. In this third example, on the other hand, a plurality of writing systems can be selectively used: e.g., a system in which the MPs write data only into their own LMs, a system in which the MPs write data into their own LMs and a plurality of other LMs, a system in which the MPs write data into a plurality of other LMs without writing data into their own LMs, and the like.

Each CHA 403 (or DKA 413) may comprise a processor 405 and a path control part 412.

Each processor 405 may comprise an MP core 406, an internal LM 407, an address decoding circuit 408, and externally attached LM 409 and the like. The path control part 412 may comprise a memory 413 and the like.

Figure 13B:
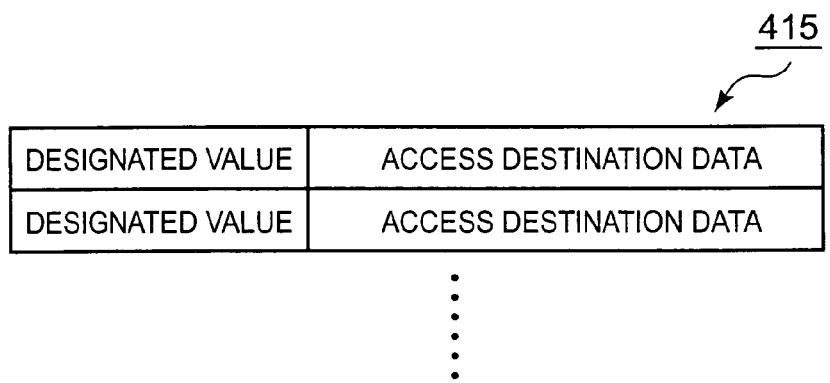
FIG. 13B shows an example of the construction of the designated value access destination map 415.

Here, as is shown for example in FIG. 13B, a designated value access destination map 415 which contains a plurality of sets of access destination data respectively corresponding to a plurality of designated values is set in the address decoding circuit 408. Here, for example, the term "designated value" may refer to a data write destination address that is designated by the MP core 406. Furthermore, the term "access destination data" may refer to data that is used to specify one or a plurality of access destinations. For example, such one or a plurality of access destinations may be internal LMs 407, externally attached LMs 409, memories 413, SMs 39 or LMs 407 of other CHAs 403 or DKAs 413.

The address decoding circuit 408 can receive commands containing designated values from the MP core 406, specify the access destination data corresponding to the designated value contained in each command from the designated value access destination map 415, and write data into one or a plurality of access destinations expressed by the specified access destination data. In concrete terms, for example, data can be written into at least one part selected from a set consisting of the internal LM 407, externally attached LM 409, memory 413, SM 39 and LM 407 of another CHA 403 or DKA 413 by a single command from the MP core 406.

EXAMPLE 4

Multi LM writing was described in the firs through third examples; in this fourth example, multi LM read-out can be performed. For example, multi LM read-out can also be realized by exchanging "read-out" for "writing" in multi LM writing; as a separate method, however, this can also be realized by the following method.

FIG. 14A is an explanatory diagram of the multi LM read-out performed in a fourth example of the first embodiment of the present invention.

A DMA processing part 581 for performing direct memory access can be installed in the MPA 583 of each CHA 503 (or DKA). Furthermore, a region for storing data issued by other MPs can be installed for each other MP in the LMs 507A through 507D of the respective MPs 505A through 505D (505B through 505D are omitted from the figures for convenience). Furthermore, regions for recording data corresponding to the sending destination MPs can be installed for each sending destination MP in the LMs 507A through 507D of the respective MPs 505A through 505D.

The switching LSI 537 may comprise a read-out map storage region 591 which is a storage region that can be accessed by the control part 553, and which can store the read-out map 592 shown for example in FIG. 14B. For instance, a read-out map 592 is prepared for each MP. For example, the LM of the other MP 505B through 505D from which data is to be read out in cases where a given region ID (e.g., LM address) is designated is stored in the read-out map 592 of the MP 505A. Furthermore, information (e.g., region IDs such as LM addresses or the like) indicating where in the LM 507A of the MP 505A data from other MPs can be written can also be recorded in the read-out map 592 of the MP 505A for each of the other MPs 505B through 505D.

Using this construction, multi LM read-out can be executed as follows:

In concrete terms, for example, in cases where the MP 505A reads out data from the LMs of the other MPs 505B through 505D, the region ID "A" can be designated for the DMA processing part 581. The DMA processing part 581 can transmit a multi LM read-out message containing the designated region ID "A" (address) and a command indicating that the operation is a multi LM read-out operation to the switching LSI 537.

The switching LSI 537 can specify the access destination MP 505B through 505D corresponding to the address (region ID) contained in the multi LM read-out message by referring to the read-out map corresponding to the MP505A, and can read out data from the region used for the MP 505A in the LM 507B through 505D of the specified access destination MP 505B through 505D. For each set of data that is read out, the switching LSI 537 can prepare a response message 284 containing said data and the region ID of the recording destination of the data, and can transmit these respective response messages to the CHAs 503.

Each time that the DMA processing part 581 of each CHA 503 receives a respective response message, this DMA processing part can write the data contained in this response message into the region in the LM 507A corresponding to the region ID contained in this response message.

Subsequently, by accessing the regions used for the other MPs, the MP 505A can acquire the data recorded in these regions.

Several preferred embodiments of the present invention were described above. However, these embodiments are merely examples used to illustrate the present invention; the scope of the present invention is not limited to these embodiments alone. The present invention may also be worked in various other aspects.

For example, instead of reading out data by an operation in which the respective MPs poll the read-out regions of their own LMs, it would also be possible to devise the system so that when data is written into the read-out region corresponding to a certain LM address of the LM, an interrupt corresponding to the LM address is issued to the MP corresponding to this LM. The MP may respond to the interrupt and read out data the read-out region if the LM address corresponding to the interrupt.

Figure 15:
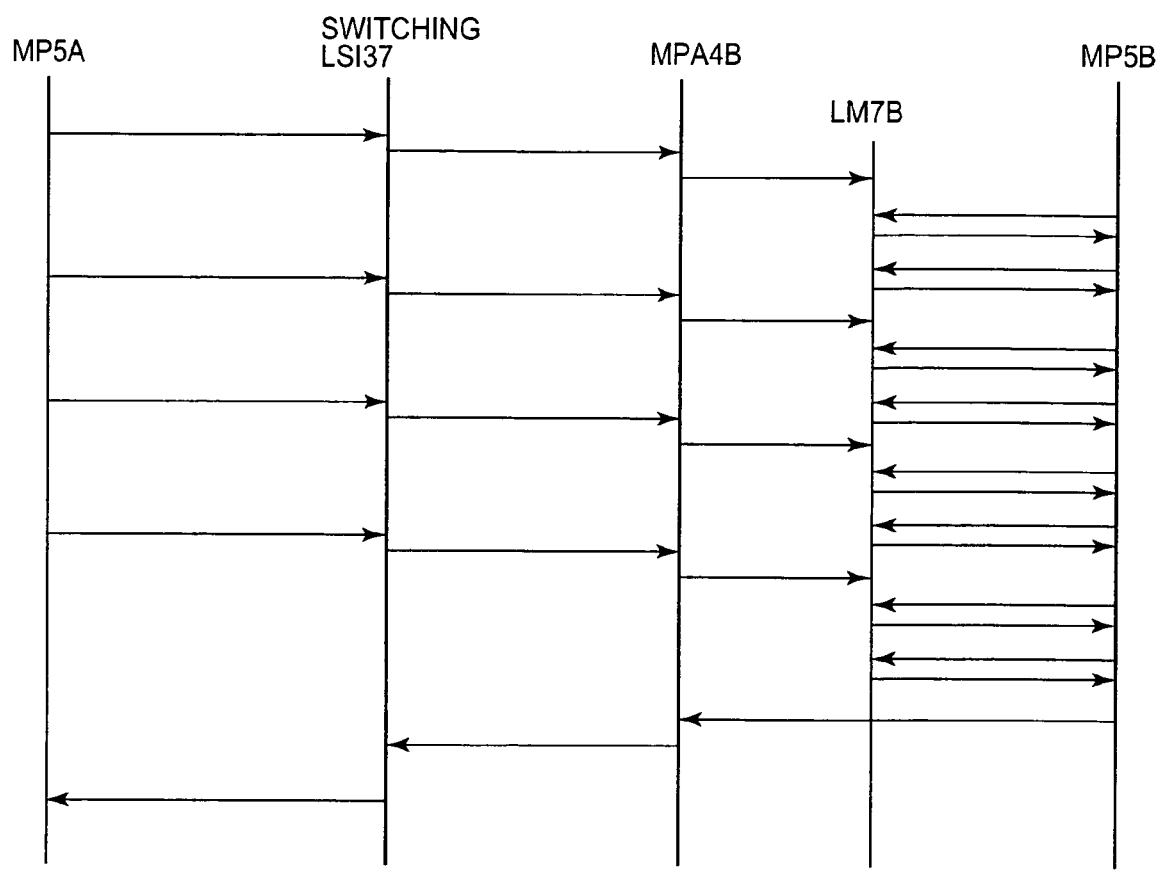
FIG. 15 shows one example of the response system that can be used by the sending destination MP.

Furthermore, for example, as is shown in FIG. 15, it would also be possible to devise the system so that the data sending destination MP 5B sends back a response (e.g., number of times of reception) to the data sending destination MP 5A at a stage in which data has been received a multiple number of times (e.g., four times). In concrete terms, for example, the sending destination MP 5B can send back a response when a punctuation in micro-control is detected (e.g., when processing has been completed up to a specified stage), when the reception of data from the MP 5A has been detected a specified number of times, or when a specified LM address is detected (e.g., when read-out has been completed up to a specified LM address). Furthermore, the switching LSI can select the response system that is used (from this response system, the response system described with reference to FIG. 6B and the response systems described with reference to FIGS. 11A through 1D) by the same method as the method described with reference to FIG. 12.

Figure 16:
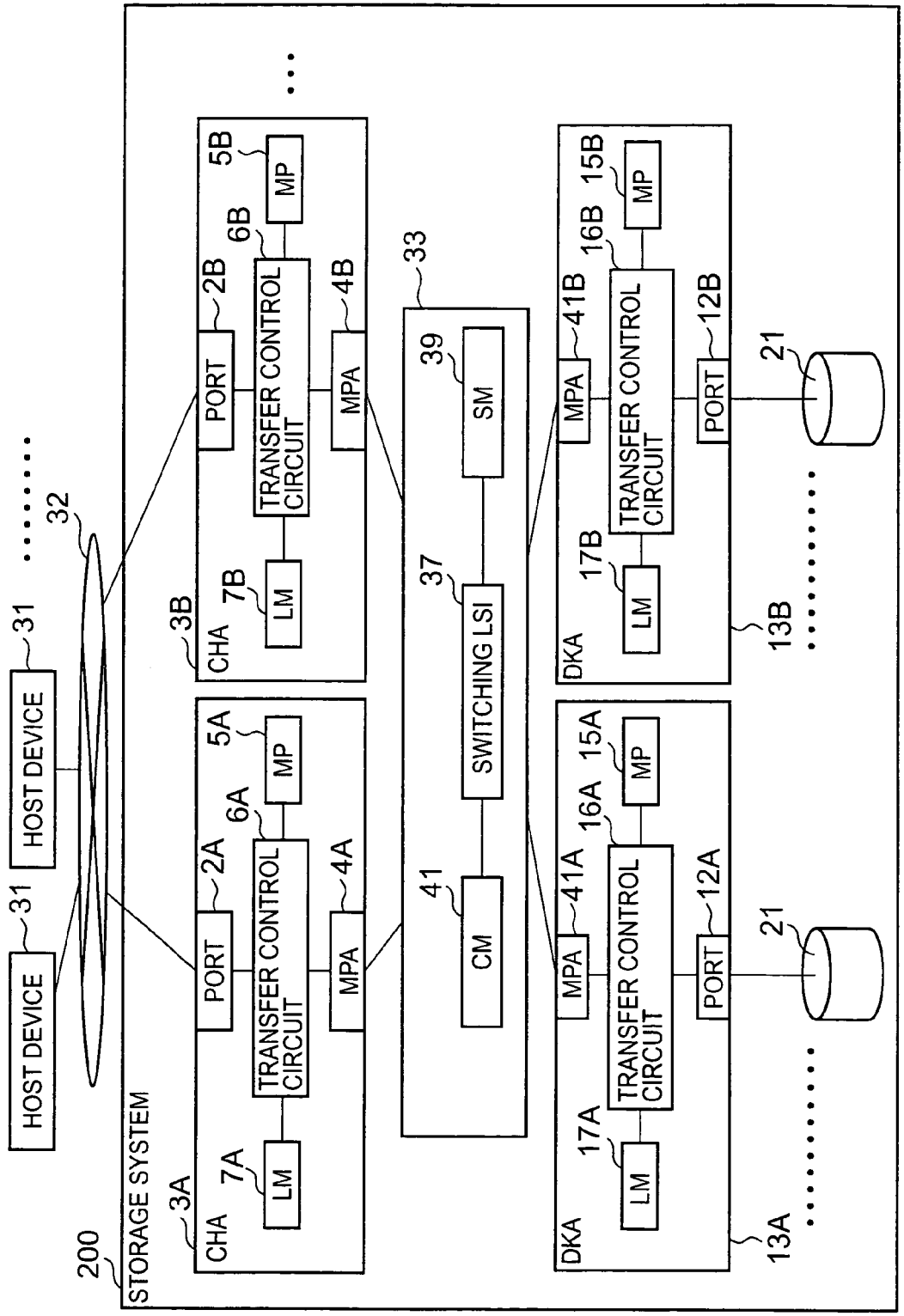
FIG. 16 shows an example of the construction of another storage system 200.

Furthermore, for example, among the SM 39, CM 41 and switching LSI 37, at least the switching LSI 37 can be mounted in the connecting part 33. In other words, for example, the switching LSI 37 can be caused to perform the operation of the connecting part 33. Or in other words, the connecting part 33 can be caused to perform the processing that is performed by the switching LSI 37. FIG. 16 shows an example of the storage system 200 in this case.

What is claimed is:

1. A storage system which performs processing for one or more storages by a plurality of processors, comprising:

a plurality of channel adapters that store data received from a host computer in a cache memory or a plurality of disk adapters which store data stored in the cache memory in the storages, the plurality of processors, wherein each of said plurality of channel adapters or disk adapters comprises a processor of the plurality of processors;

a plurality of local memories which are respectively provided for said plurality of processors, wherein each of said plurality of channel adapters or disk adapters comprises a local memory of the plurality of local memories;

a memory for storing control information communicated between said plurality of channel adapters or said plurality of disk adapters;

a controller connected to said memory for storing control information; and one or more intermediate devices connected to said plurality of processors and said controller so that communications are possible, wherein each of said plurality of local memories has a plurality of local memory addresses and local memory regions respectively corresponding to said plurality of local memory addresses, wherein a first intermediate device that is connected to one processor of said plurality of processors transmits to said controller a first access message including a designated value which is a value designated by the one processor of said plurality of processors, wherein said controller receives the first access message from said first intermediate device, specifies a local memory address corresponding to the designated value included in said received first access message, and transmits a second access message including the specified local memory address to two or more other processors of said plurality of processors, said two or more other processors being different from said one processor of said plurality of processors, wherein a second intermediate device respectively connected to said two or more other processors receives said second access message, and said second intermediate device or said two or more other processors access the local memory regions of two or more local memories respectively corresponding to said two or more other processors, which are local memory regions corresponding to local memory addresses included in said second access message, wherein said controller controls the locking on and locking off of each of the local memory addresses, wherein, in cases where the local memory address corresponding to the designated value included in said received first access message is locked off, said controller locks on this local memory address, and said first access message is subsequently processed, and said controller locks off said local memory address at a timing following the transmission of said second access message, wherein, in cases where the local memory address corresponding to the designated value included in said received first access message is locked on, said controller executes the processing of said first access message after said local memory address is locked off, wherein said plurality of processors send a request to said controller requesting that the local memory address corresponding to the local memory region be locked on before reading out data from this local memory region of the local memory prepared for each of said plurality of processors, wherein said controller transmits notification to said plurality of processors as to whether or not the local memory addresses that are the object of requests from said plurality of processors have been successfully locked on, and wherein, in cases where notification that locking on has been successfully accomplished is received by said plurality of processors, said plurality of processors read out data from said local memory regions.

2. The storage system according to claim 1, wherein the same local memory address of said plurality of local memories is assigned to a specified processor of said plurality of processors, and the local memory region corresponding to the local memory address assigned to said specified processor is a write region for said specified processor, and a read-out region for said other processors of said plurality of processors.

3. The storage system according to claim 2, wherein said specified processor writes data into said write region, and said first intermediate device transmits said first access message in which the local memory address corresponding to said write region is taken as said designated value to said controller.

4. The storage system according to claim 1, further comprising:

an access map recording a plurality of sets of access destination data respectively corresponding to a plurality of designated values, wherein it is noted which processor of said plurality of processors is taken as the access destination for each of said plurality of sets of access destination data, and said controller specifies the access destination data corresponding to the designated value included in said received first access message from said access map, and transmits said second access message to two or more other processors of said plurality of processors expressed by said specified access destination data.

5. The storage system according to claim 1, wherein said two or more other processors constitute a processor group that has specified attributes.

6. The storage system according to claim 1, wherein a shared memory that can be accessed by said plurality of processors via said controller is connected to said controller.

7. The storage system according to claim 1, wherein said controller determines said two or more other processors of said plurality of processors based on the designated value included in said first access message, and the one processor of said plurality of processors that designated said designated value.

8. The storage system according to claim 1, wherein a first path from said controller to said respective intermediate devices and a second path from said respective intermediate devices to said controller are disposed between said controller and the respective intermediate devices, and said controller receives said first access message via said second path, and transmits said second access message via said first path.

9. The storage system according to claim 1, wherein said controller executes one of the following response systems (A) through (F) in cases where said controller receives said first access message and transmits said second access message:

(A) the controller sends back a response to said one processor of said plurality of processor before receiving a response to said second access message from said two or more other processors;

(B) the controller sends back a response to said one processor of said plurality of processors each time that the controller receives a response to said second access message from each of said two or more other processors;

(C) the controller sends back a response to said one processor of said plurality of processors after receiving a response to said second access message from all of said two or more other processors;

(D) the controller sends back a response to said one processor of said plurality of processors each time that a response output from said two or more other processors is received from each of said two or more other processors in cases where data is written into said two or more local memories in accordance with said second access message;

(E) the controller sends back a response to said one processor of said plurality of processors after receiving a response output from said two or more other processors in cases where data is written into said two or more local memories in accordance with said second access message from all of said two or more other processors; and (F) the controller performs reception of said first access message and transmission of said second access message a multiple number of times, and sends back a response to said one processor of said plurality of processors after receiving a plurality of responses to said plurality of second access messages from said two or more other processors.

10. The storage system according to claim 9, wherein said controller employs one response system among said response systems (A) through (F) based on at least one feature selected from the reliability with which access is accurately performed, the occupation rate of the path between said controller and said intermediate devices, and the length of the response time required for the response to said one processor of said plurality of processors after said first access message has been transmitted, and executes the selected response system.

11. The storage system according to claim 1, wherein a plurality of storage devices including a local memory prepared for the one processor of said plurality of processors and other local memories for other processors of the plurality of processors other than said one processor are disposed in each processor of the plurality of processors, wherein each processor of the plurality of processors comprises a processor core which issues the designated value, and an access control circuit which determines two or more storage devices from a plurality of storage devices including a local memory prepared for said processor and local memories for other processors based on the value issued by said processor, and each processor accesses said two or more determined storage devices.

* * * * *